(12) United States Patent
Savage et al.

(10) Patent No.: US 10,530,854 B2
(45) Date of Patent: Jan. 7, 2020

(54) SYNCHRONIZATION OF PERMISSIONED CONTENT IN CLOUD-BASED ENVIRONMENTS

(71) Applicant: Box, Inc., Los Altos, CA (US)

(72) Inventors: Brandon Savage, San Carlos, CA (US); Kunal Parmar, San Jose, CA (US); David Grant Sawyer, Mountain View, CA (US); Lu Pan, Foster City, CA (US); Yiming Lu, Los Altos, CA (US); David MacKenzie, San Francisco, CA (US); Jeremy Jen-Ming Chiu, Milpitas, CA (US)

(73) Assignee: Box, Inc., Redwood City, CA (US)

( * ) Notice: Subject to any disclaimer, the term of this patent is extended or adjusted under 35 U.S.C. 154(b) by 198 days.

(21) Appl. No.: 14/726,196

(22) Filed: May 29, 2015

(65) Prior Publication Data
US 2016/0065672 A1 Mar. 3, 2016
US 2017/0374143 A9 Dec. 28, 2017

Related U.S. Application Data

(60) Provisional application No. 62/044,920, filed on Sep. 2, 2014, provisional application No. 62/006,799, filed (Continued)

(51) Int. Cl.
H04L 29/08 (2006.01)
(52) U.S. Cl.
CPC .......... H04L 67/1095 (2013.01); H04L 67/10 (2013.01); H04L 67/1097 (2013.01)
(58) Field of Classification Search
CPC ......... H04L 7/00; H04L 7/0008; H04L 29/00; H04L 29/02; H04L 29/08;
(Continued)

(56) References Cited

U.S. PATENT DOCUMENTS 858,619 A 7/1907 O'Farrell
5,043,876 A 8/1991 Terry
(Continued)

FOREIGN PATENT DOCUMENTS

CA 2724521 A1 11/2009
CN 101997924 A 3/2011
(Continued)

OTHER PUBLICATIONS

Ivens, "Using and Troubleshooting Offline Files," Jun. 23, 2002, Windows IT Pro, Figure 1.
(Continued)

Primary Examiner — Michael A Keller
Assistant Examiner — Boris D Grijalva Lobos
(74) Attorney, Agent, or Firm — Sheridan Ross P.C.

(57) ABSTRACT

Enterprise administrators in a cloud-based environment including a cloud-based server and a repository can selectively impose permissions on items (e.g., files and folders) marked for synchronization ("sync items"). The sync items can be synchronized with the client devices of users by downloading the items along with the permission attributes from the cloud-based server. However, the permissions on those sync items means that any unpermitted changes to the local copies of the sync items do not get uploaded to the cloud-based server. A synchronization client on the client devices detects any changes made locally to the sync items that are not consistent with the permission attributes, and repairs those changes so that the sync items are restored to their most recent states. This ensures that any unauthorized changes made to sync items remain local and do not propagate by the synchronization process to other users.

20 Claims, 17 Drawing Sheets

Related U.S. Application Data on Jun. 2, 2014, provisional application No. 62/005,659, filed on May 30, 2014.

(58) Field of Classification Search
CPC ......... H04L 29/08099; H04L 29/08117; H04L 29/08126; H04L 29/08306; H04L 67/00; H04L 67/10; H04L 67/1095; H04L 67/1097; G06F 11/00; G06F 11/30–3006; G06F 11/3055; G06F 13/00; G06F 13/14; G06F 15/00; G06F 15/06; G06F 15/163; G06F 15/17; G06F 15/173

See application file for complete search history.

(56) References Cited

U.S. PATENT DOCUMENTS

| | | | |
|---|---|---|---|
| 5,742,905 A * | 4/1998 | Pepe | H04L 12/58 379/211.01 |
| 5,748,735 A | 5/1998 | Ganesan | |
| 5,774,717 A | 6/1998 | Porcaro | |
| 5,787,175 A | 7/1998 | Carter | |
| 5,799,320 A | 8/1998 | Klug | |
| 5,848,415 A | 12/1998 | Guck | |
| 5,864,870 A | 1/1999 | Guck | |
| 5,926,816 A | 7/1999 | Bauer et al. | |
| 5,999,908 A | 12/1999 | Abelow | |
| 6,016,467 A | 1/2000 | Newsted et al. | |
| 6,034,621 A | 3/2000 | Kaufman | |
| 6,055,543 A | 4/2000 | Christensen et al. | |
| 6,073,161 A | 6/2000 | DeBoskey et al. | |
| 6,098,078 A | 8/2000 | Gehani et al. | |
| 6,226,618 B1 | 5/2001 | Downs et al. | |
| 6,233,600 B1 | 5/2001 | Salas et al. | |
| 6,260,040 B1 | 7/2001 | Kauffman et al. | |
| 6,279,109 B1 | 8/2001 | Brundridge | |
| 6,289,345 B1 | 9/2001 | Yasue | |
| 6,292,803 B1 | 9/2001 | Richardson et al. | |
| 6,336,124 B1 | 1/2002 | Alam et al. | |
| 6,342,906 B1 | 1/2002 | Kumar et al. | |
| 6,345,386 B1 | 2/2002 | Delo et al. | |
| 6,370,543 B2 | 4/2002 | Hoffert et al. | |
| 6,374,260 B1 | 4/2002 | Hoffert et al. | |
| 6,385,606 B2 | 5/2002 | Inohara et al. | |
| 6,396,593 B1 | 5/2002 | Laverty et al. | |
| 6,441,641 B1 | 8/2002 | Pang et al. | |
| 6,446,091 B1 | 9/2002 | Noren et al. | |
| 6,449,622 B1 | 9/2002 | LaRue et al. | |
| 6,515,681 B1 | 2/2003 | Knight | |
| 6,539,381 B1 | 3/2003 | Prasad et al. | |
| 6,584,466 B1 | 6/2003 | Serbinis et al. | |
| 6,636,872 B1 | 10/2003 | Heath et al. | |
| 6,636,897 B1 | 10/2003 | Sherman et al. | |
| 6,654,737 B1 | 11/2003 | Nunez | |
| 6,662,186 B1 | 12/2003 | Esquibel et al. | |
| 6,687,878 B1 | 2/2004 | Eintracht et al. | |
| 6,714,968 B1 | 3/2004 | Prust | |
| 6,735,623 B1 | 5/2004 | Prust | |
| 6,742,181 B1 | 5/2004 | Koike et al. | |
| 6,760,721 B1 | 7/2004 | Chasen et al. | |
| 6,947,162 B2 | 9/2005 | Rosenberg et al. | |
| 6,952,724 B2 | 10/2005 | Prust | |
| 6,996,768 B1 | 2/2006 | Elo et al. | |
| 7,003,667 B1 | 2/2006 | Slick et al. | |
| 7,010,752 B2 | 3/2006 | Ly | |
| 7,020,697 B1 | 3/2006 | Goodman et al. | |
| 7,039,806 B1 | 5/2006 | Friedman et al. | |
| 7,069,393 B2 | 6/2006 | Miyata et al. | |
| 7,080,104 B2 | 7/2006 | Ring et al. | |
| 7,130,831 B2 | 10/2006 | Howard et al. | |
| 7,133,834 B1 | 11/2006 | Abelow | |
| 7,143,136 B1 | 11/2006 | Drenan et al. | |
| 7,149,787 B1 | 12/2006 | Mutalik et al. | |
| 7,152,182 B2 | 12/2006 | Ji et al. | |
| 7,155,483 B1 | 12/2006 | Friend et al. | |
| 7,165,107 B2 | 1/2007 | Pouyoul et al. | |
| 7,171,468 B2 | 1/2007 | Yeung et al. | |
| 7,178,021 B1 | 2/2007 | Hanna et al. | |
| 7,222,078 B2 | 5/2007 | Abelow | |
| 7,233,997 B1 | 6/2007 | Leveridge et al. | |
| 7,275,244 B1 | 9/2007 | Charles Bell et al. | |
| 7,296,025 B2 | 11/2007 | Kung et al. | |
| 7,310,684 B2 * | 12/2007 | Patrick | G06Q 10/00 709/206 |
| 7,346,778 B1 | 3/2008 | Guiter et al. | |
| 7,353,252 B1 | 4/2008 | Yang et al. | |
| 7,362,868 B2 | 4/2008 | Madoukh et al. | |
| 7,363,330 B1 | 4/2008 | Ellman et al. | |
| 7,370,269 B1 | 5/2008 | Prabhu et al. | |
| 7,380,120 B1 | 5/2008 | Garcia | |
| 7,386,535 B1 | 6/2008 | Kalucha et al. | |
| 7,401,117 B2 | 7/2008 | Dan et al. | |
| 7,543,000 B2 | 6/2009 | Castro et al. | |
| 7,581,221 B2 | 8/2009 | Lai et al. | |
| 7,620,565 B2 | 11/2009 | Abelow | |
| 7,647,559 B2 | 1/2010 | Yozell-Epstein et al. | |
| 7,650,367 B2 | 1/2010 | Arruza | |
| 7,653,668 B1 | 1/2010 | Shelat et al. | |
| 7,661,088 B2 | 2/2010 | Burke | |
| 7,665,093 B2 | 2/2010 | Maybee et al. | |
| 7,676,542 B2 | 3/2010 | Moser et al. | |
| 7,698,363 B2 | 4/2010 | Dan et al. | |
| 7,734,600 B1 | 6/2010 | Wise et al. | |
| 7,735,144 B2 * | 6/2010 | Pravetz | G06F 21/6218 705/50 |
| 7,739,411 B2 | 6/2010 | Messer et al. | |
| 7,756,843 B1 | 7/2010 | Palmer | |
| 7,774,412 B1 | 8/2010 | Schnepel | |
| 7,814,426 B2 | 10/2010 | Huesken et al. | |
| 7,886,287 B1 | 2/2011 | Davda | |
| 7,886,295 B2 | 2/2011 | Burger et al. | |
| 7,890,964 B2 | 2/2011 | Vogler-Ivashchanka et al. | |
| 7,937,663 B2 | 5/2011 | Parker et al. | |
| 7,958,353 B2 | 6/2011 | Matsuzaki et al. | |
| 7,958,453 B1 | 6/2011 | Taing | |
| 7,979,296 B2 | 7/2011 | Kruse et al. | |
| 7,996,374 B1 | 8/2011 | Jones et al. | |
| 8,027,976 B1 | 9/2011 | Ding et al. | |
| RE42,904 E | 11/2011 | Stephens, Jr. | |
| 8,065,739 B1 | 11/2011 | Bruening et al. | |
| 8,090,361 B2 | 1/2012 | Hagan | |
| 8,103,662 B2 | 1/2012 | Eagan et al. | |
| 8,117,261 B2 | 2/2012 | Briere et al. | |
| 8,126,848 B2 * | 2/2012 | Wagner | G06F 17/30575 707/609 |
| 8,140,513 B2 | 3/2012 | Ghods et al. | |
| 8,151,183 B2 | 4/2012 | Chen et al. | |
| 8,185,830 B2 | 5/2012 | Saha et al. | |
| 8,200,582 B1 | 6/2012 | Zhu | |
| 8,201,230 B2 | 6/2012 | Day et al. | |
| 8,214,747 B1 | 7/2012 | Yankovich et al. | |
| 8,230,348 B2 | 7/2012 | Peters et al. | |
| 8,239,918 B1 | 8/2012 | Cohen | |
| 8,326,814 B2 | 12/2012 | Ghods et al. | |
| 8,347,276 B2 | 1/2013 | Schadow | |
| 8,358,701 B2 | 1/2013 | Chou et al. | |
| 8,370,803 B1 | 2/2013 | Holler et al. | |
| 8,429,540 B1 | 4/2013 | Yankovich et al. | |
| 8,447,820 B1 | 5/2013 | Gay | |
| 8,458,128 B2 | 6/2013 | Khosravy et al. | |
| 8,464,161 B2 | 6/2013 | Giles et al. | |
| 8,464,167 B2 * | 6/2013 | Saund | H04L 12/1827 715/758 |
| 8,473,775 B1 | 6/2013 | Helmick et al. | |
| 8,515,902 B2 | 8/2013 | Savage | |
| 8,527,549 B2 | 9/2013 | Cidon | |
| 8,528,087 B2 * | 9/2013 | Hsu | G06F 21/566 711/163 |
| 8,549,066 B1 | 10/2013 | Donahue et al. | |
| 8,549,511 B2 | 10/2013 | Seki et al. | |
| 8,572,022 B2 * | 10/2013 | Hagan | G06F 17/30581 707/608 |
| 8,582,777 B2 | 11/2013 | Urivskiy et al. | |
| 8,583,619 B2 | 11/2013 | Ghods et al. | |
| 8,607,306 B1 | 12/2013 | Bridge et al. | |

(56) References Cited

U.S. PATENT DOCUMENTS

| | | | |
|---|---|---|---|
| 8,650,498 B1 | 2/2014 | Mihovilovic | |
| 8,719,445 B2 | 5/2014 | Ko | |
| 8,719,810 B2 | 5/2014 | Oh | |
| 8,745,267 B2 | 6/2014 | Luecke et al. | |
| 8,782,637 B2 | 7/2014 | Khalid | |
| 8,819,068 B1* | 8/2014 | Knote | G06F 17/30339 707/790 |
| 8,825,597 B1 | 9/2014 | Houston et al. | |
| 8,849,955 B2 | 9/2014 | Prahlad et al. | |
| 8,868,574 B2 | 10/2014 | Kiang et al. | |
| 8,869,235 B2* | 10/2014 | Qureshi | H04L 63/20 713/150 |
| 8,886,925 B2* | 11/2014 | Qureshi | H04L 63/20 713/150 |
| 8,892,679 B1 | 11/2014 | Destagnol et al. | |
| 8,914,856 B1 | 12/2014 | Velummylum et al. | |
| 8,914,900 B2 | 12/2014 | Smith et al. | |
| 8,918,387 B1 | 12/2014 | Sokolov | |
| 8,949,179 B2 | 2/2015 | Besen et al. | |
| 8,949,939 B2 | 2/2015 | Peddada | |
| 8,955,103 B2 | 2/2015 | Kline, III et al. | |
| 8,956,103 B2 | 2/2015 | Gehring | |
| 8,959,579 B2 | 2/2015 | Barton et al. | |
| 8,966,062 B1 | 2/2015 | Giese et al. | |
| 8,990,307 B2 | 3/2015 | Barreto et al. | |
| 8,990,955 B2 | 3/2015 | Hymel et al. | |
| 9,015,248 B2 | 4/2015 | Barreto et al. | |
| 9,054,919 B2 | 6/2015 | Kiang et al. | |
| 9,213,684 B2 | 12/2015 | Lai et al. | |
| 9,239,846 B2 | 1/2016 | Besen et al. | |
| 9,244,934 B2 | 1/2016 | Besen et al. | |
| 9,268,655 B2* | 2/2016 | Chan | G06F 17/30174 |
| 9,396,216 B2 | 7/2016 | Barreto et al. | |
| 9,396,245 B2 | 7/2016 | Mackenzie et al. | |
| 9,407,664 B1* | 8/2016 | Banerjee | H04L 63/20 |
| 9,495,434 B1* | 11/2016 | Walton | G06F 17/30575 |
| 9,507,795 B2 | 11/2016 | Dorman et al. | |
| 9,547,658 B2* | 1/2017 | Fan | G06F 17/30126 |
| 9,553,758 B2 | 1/2017 | Rexer | |
| 9,558,202 B2 | 1/2017 | Lockhart et al. | |
| 9,563,517 B1* | 2/2017 | Natanzon | G06F 11/1464 |
| 9,575,981 B2 | 2/2017 | Dorman et al. | |
| 9,633,037 B2 | 5/2017 | Smith et al. | |
| 9,652,741 B2 | 5/2017 | Goldberg et al. | |
| 9,773,051 B2 | 9/2017 | Smith | |
| 2001/0027492 A1 | 10/2001 | Gupta | |
| 2002/0029218 A1 | 3/2002 | Bentley et al. | |
| 2002/0091738 A1 | 7/2002 | Rohrbaugh et al. | |
| 2002/0099772 A1 | 7/2002 | Deshpande et al. | |
| 2002/0116544 A1 | 8/2002 | Barnard et al. | |
| 2002/0133509 A1 | 9/2002 | Johnston et al. | |
| 2002/0147770 A1 | 10/2002 | Tang | |
| 2002/0194177 A1 | 12/2002 | Sherman et al. | |
| 2003/0041095 A1 | 2/2003 | Konda et al. | |
| 2003/0070071 A1* | 4/2003 | Riedel | G06F 21/6218 713/165 |
| 2003/0073448 A1 | 4/2003 | Ozeki et al. | |
| 2003/0084306 A1 | 5/2003 | Abburi et al. | |
| 2003/0093404 A1 | 5/2003 | Bader et al. | |
| 2003/0097374 A1* | 5/2003 | Himeno | G06F 17/30864 |
| 2003/0108052 A1 | 6/2003 | Inoue et al. | |
| 2003/0110264 A1 | 6/2003 | Whidby et al. | |
| 2003/0115326 A1 | 6/2003 | Verma et al. | |
| 2003/0135536 A1 | 7/2003 | Lyons | |
| 2003/0135565 A1 | 7/2003 | Estrada | |
| 2003/0154306 A1 | 8/2003 | Perry | |
| 2003/0204490 A1 | 10/2003 | Kasriel | |
| 2003/0217171 A1 | 11/2003 | Von Stuermer et al. | |
| 2003/0228015 A1 | 12/2003 | Futa et al. | |
| 2004/0003104 A1 | 1/2004 | Boskovic et al. | |
| 2004/0021686 A1 | 2/2004 | Barberis | |
| 2004/0076187 A1 | 4/2004 | Peled | |
| 2004/0088647 A1 | 5/2004 | Miller et al. | |
| 2004/0098361 A1 | 5/2004 | Peng | |
| 2004/0103147 A1 | 5/2004 | Flesher et al. | |
| 2004/0111415 A1 | 6/2004 | Scardino et al. | |
| 2004/0117438 A1 | 6/2004 | Considine et al. | |
| 2004/0122949 A1 | 6/2004 | Zmudzinski et al. | |
| 2004/0128359 A1 | 7/2004 | Horvitz et al. | |
| 2004/0162836 A1 | 8/2004 | Aronoff et al. | |
| 2004/0177138 A1 | 9/2004 | Salle et al. | |
| 2004/0181579 A1 | 9/2004 | Huck et al. | |
| 2004/0196307 A1 | 10/2004 | Zak et al. | |
| 2004/0201604 A1 | 10/2004 | Kraenzel et al. | |
| 2004/0218214 A1 | 11/2004 | Kihara et al. | |
| 2004/0230624 A1 | 11/2004 | Frolund et al. | |
| 2004/0230652 A1 | 11/2004 | Estrada et al. | |
| 2004/0230891 A1* | 11/2004 | Pravetz | G06F 21/6218 715/229 |
| 2004/0246532 A1 | 12/2004 | Inada | |
| 2004/0260977 A1 | 12/2004 | Ji et al. | |
| 2004/0267825 A1 | 12/2004 | Novak et al. | |
| 2004/0267836 A1 | 12/2004 | Armangau et al. | |
| 2005/0005276 A1 | 1/2005 | Morgan | |
| 2005/0010860 A1 | 1/2005 | Weiss et al. | |
| 2005/0022175 A1 | 1/2005 | Sliger et al. | |
| 2005/0022229 A1 | 1/2005 | Gabriel et al. | |
| 2005/0028006 A1 | 2/2005 | Leser et al. | |
| 2005/0033777 A1 | 2/2005 | Moraes et al. | |
| 2005/0038997 A1 | 2/2005 | Kojima et al. | |
| 2005/0050228 A1 | 3/2005 | Perham et al. | |
| 2005/0055306 A1 | 3/2005 | Miller et al. | |
| 2005/0063083 A1 | 3/2005 | Dart et al. | |
| 2005/0097061 A1 | 5/2005 | Shapiro et al. | |
| 2005/0097225 A1 | 5/2005 | Glatt et al. | |
| 2005/0097434 A1 | 5/2005 | Storisteanu | |
| 2005/0102328 A1 | 5/2005 | Ring et al. | |
| 2005/0108406 A1 | 5/2005 | Lee et al. | |
| 2005/0114305 A1 | 5/2005 | Haynes et al. | |
| 2005/0114378 A1 | 5/2005 | Elien et al. | |
| 2005/0138118 A1 | 6/2005 | Banatwala et al. | |
| 2005/0172284 A1 | 8/2005 | Dandekar et al. | |
| 2005/0182966 A1 | 8/2005 | Pham et al. | |
| 2005/0198299 A1 | 9/2005 | Beck et al. | |
| 2005/0198452 A1 | 9/2005 | Watanabe | |
| 2005/0223047 A1 | 10/2005 | Shah et al. | |
| 2005/0234864 A1 | 10/2005 | Shapiro | |
| 2005/0234943 A1 | 10/2005 | Clarke | |
| 2005/0261933 A1 | 11/2005 | Magnuson | |
| 2006/0005163 A1 | 1/2006 | Huesken et al. | |
| 2006/0026502 A1 | 2/2006 | Dutta | |
| 2006/0026535 A1 | 2/2006 | Hotelling et al. | |
| 2006/0036568 A1 | 2/2006 | Moore et al. | |
| 2006/0041603 A1 | 2/2006 | Paterson et al. | |
| 2006/0041752 A1 | 2/2006 | Tuvell et al. | |
| 2006/0047804 A1 | 3/2006 | Fredricksen et al. | |
| 2006/0053088 A1 | 3/2006 | Ali et al. | |
| 2006/0053380 A1 | 3/2006 | Spataro et al. | |
| 2006/0070083 A1 | 3/2006 | Brunswig et al. | |
| 2006/0075071 A1 | 4/2006 | Gillette | |
| 2006/0117247 A1 | 6/2006 | Fite et al. | |
| 2006/0123062 A1 | 6/2006 | Bobbitt et al. | |
| 2006/0133340 A1 | 6/2006 | Rybak et al. | |
| 2006/0168550 A1 | 7/2006 | Muller et al. | |
| 2006/0173952 A1 | 8/2006 | Coyle | |
| 2006/0174051 A1 | 8/2006 | Lordi et al. | |
| 2006/0174054 A1 | 8/2006 | Matsuki | |
| 2006/0179070 A1 | 8/2006 | George et al. | |
| 2006/0179309 A1 | 8/2006 | Cross et al. | |
| 2006/0242204 A1 | 10/2006 | Karas et al. | |
| 2006/0242206 A1 | 10/2006 | Brezak et al. | |
| 2006/0259524 A1 | 11/2006 | Horton | |
| 2006/0265719 A1 | 11/2006 | Astl et al. | |
| 2006/0271510 A1 | 11/2006 | Harward et al. | |
| 2006/0288043 A1 | 12/2006 | Novak et al. | |
| 2007/0011469 A1* | 1/2007 | Allison | G06F 21/6209 713/193 |
| 2007/0016680 A1 | 1/2007 | Burd et al. | |
| 2007/0028291 A1 | 2/2007 | Brennan et al. | |
| 2007/0038934 A1 | 2/2007 | Fellman | |
| 2007/0067349 A1 | 3/2007 | Jhaveri et al. | |
| 2007/0079242 A1 | 4/2007 | Jolley et al. | |
| 2007/0100830 A1 | 5/2007 | Beedubail et al. | |
| 2007/0115845 A1 | 5/2007 | Hochwarth et al. | |

(56) References Cited

U.S. PATENT DOCUMENTS

| | | |
|---|---|---|
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0142039 A1 | 6/2007 | Bushnell et al. |
| 2007/0157203 A1 | 7/2007 | Lim |
| 2007/0162610 A1 | 7/2007 | Un et al. |
| 2007/0179993 A1 | 8/2007 | Arruza |
| 2007/0185885 A1 | 8/2007 | Tamura |
| 2007/0195779 A1 | 8/2007 | Judge et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220014 A1* | 9/2007 | Emling ................. G06F 16/168 |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0040560 A1 | 2/2008 | Hall et al. |
| 2008/0046828 A1 | 2/2008 | Bibliowicz et al. |
| 2008/0059474 A1 | 3/2008 | Lim |
| 2008/0059656 A1 | 3/2008 | Saliba et al. |
| 2008/0060080 A1 | 3/2008 | Lim |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0154977 A1* | 6/2008 | Schmidt ................. G06F 16/972 |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0195673 A1 | 8/2008 | Hamel et al. |
| 2008/0215883 A1 | 9/2008 | Fok et al. |
| 2008/0222654 A1 | 9/2008 | Xu et al. |
| 2008/0243846 A1* | 10/2008 | Rasmussen ....... G06F 17/30171 |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2008/0294899 A1 | 11/2008 | Gazzetta et al. |
| 2008/0306900 A1* | 12/2008 | Tamura ............. G06F 17/30144 |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0043848 A1 | 2/2009 | Kordun |
| 2009/0044128 A1 | 2/2009 | Baumgarten et al. |
| 2009/0049131 A1 | 2/2009 | Lyle et al. |
| 2009/0097374 A1 | 4/2009 | Shoji et al. |
| 2009/0119322 A1 | 5/2009 | Mills et al. |
| 2009/0125469 A1 | 5/2009 | Mcdonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0172201 A1 | 7/2009 | Carmel |
| 2009/0177754 A1 | 7/2009 | Brezina et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276660 A1 | 11/2009 | Griffith et al. |
| 2009/0276771 A1 | 11/2009 | Nickolov et al. |
| 2009/0282212 A1 | 11/2009 | Peterson |
| 2009/0282483 A1 | 11/2009 | Bennett |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327405 A1 | 12/2009 | FitzGerald et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0017619 A1 | 1/2010 | Errico |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082396 A1 | 4/2010 | Caldwell et al. |
| 2010/0082534 A1 | 4/2010 | Sagar et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0122184 A1 | 5/2010 | Vonog et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0154025 A1 | 6/2010 | Esteve Balducci et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205392 A1 | 8/2010 | Schnapp et al. |
| 2010/0205537 A1 | 8/2010 | Knighton et al. |
| 2010/0212010 A1 | 8/2010 | Stringer et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0242028 A1 | 9/2010 | Weigert |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |

(56) References Cited

U.S. PATENT DOCUMENTS

| | | |
|---|---|---|
| 2010/0262953 A1 | 10/2010 | Barboni et al. |
| 2010/0267588 A1 | 10/2010 | Nelson et al. |
| 2010/0269164 A1* | 10/2010 | Sosnosky ............ H04L 67/1095 726/7 |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0312615 A1 | 12/2010 | Murphy et al. |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332818 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0078243 A1 | 3/2011 | Carpenter et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0107088 A1 | 5/2011 | Eng et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0125847 A1 | 5/2011 | Cocheu et al. |
| 2011/0131299 A1 | 6/2011 | Sardary |
| 2011/0137991 A1 | 6/2011 | Russell |
| 2011/0138479 A1* | 6/2011 | Jain ..................... G06F 21/64 726/28 |
| 2011/0142410 A1 | 6/2011 | Ishii |
| 2011/0145187 A1 | 6/2011 | Himmelsbach et al. |
| 2011/0145282 A1 | 6/2011 | Moore et al. |
| 2011/0145589 A1 | 6/2011 | Camenisch et al. |
| 2011/0145744 A1 | 6/2011 | Haynes et al. |
| 2011/0154180 A1 | 6/2011 | Evanitsky et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0218964 A1 | 9/2011 | Hagan et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252312 A1 | 10/2011 | Lemonik et al. |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0264621 A1 | 10/2011 | Burjoski |
| 2011/0276683 A1 | 11/2011 | Goldschlag et al. |
| 2011/0277027 A1 | 11/2011 | Hayton et al. |
| 2011/0282710 A1 | 11/2011 | Akkiraju et al. |
| 2011/0289433 A1 | 11/2011 | Whalin et al. |
| 2011/0295798 A1* | 12/2011 | Shain ................. G06F 11/2058 707/617 |
| 2011/0296022 A1 | 12/2011 | Ferris et al. |
| 2011/0313803 A1 | 12/2011 | Friend et al. |
| 2011/0314145 A1 | 12/2011 | Raleigh et al. |
| 2011/0320197 A1 | 12/2011 | Conejero et al. |
| 2011/0320936 A1 | 12/2011 | Mohan et al. |
| 2012/0030187 A1* | 2/2012 | Marano ............... G06F 21/6218 707/709 |
| 2012/0036370 A1 | 2/2012 | Lim et al. |
| 2012/0057696 A1 | 3/2012 | Chew |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089610 A1 | 4/2012 | Agrawal et al. |
| 2012/0089659 A1 | 4/2012 | Halevi et al. |
| 2012/0089710 A1 | 4/2012 | Rakowski et al. |
| 2012/0096521 A1 | 4/2012 | Peddada |
| 2012/0101995 A1 | 4/2012 | Agetsuma et al. |
| 2012/0108200 A1 | 5/2012 | Rubin et al. |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0143825 A1 | 6/2012 | Boehm et al. |
| 2012/0144283 A1 | 6/2012 | Hill et al. |
| 2012/0150888 A1 | 6/2012 | Hyatt et al. |
| 2012/0151265 A1 | 6/2012 | Bender et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0166516 A1 | 6/2012 | Simmons et al. |
| 2012/0173612 A1 | 7/2012 | Vegesna-Venkata et al. |
| 2012/0173625 A1 | 7/2012 | Berger |
| 2012/0179802 A1 | 7/2012 | Narasimhan et al. |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203670 A1 | 8/2012 | Piersol |
| 2012/0203908 A1 | 8/2012 | Beaty et al. |
| 2012/0204032 A1 | 8/2012 | Wilkins et al. |
| 2012/0206653 A1 | 8/2012 | Graves et al. |
| 2012/0207449 A1 | 8/2012 | Angquist et al. |
| 2012/0209815 A1 | 8/2012 | Carson et al. |
| 2012/0209889 A1 | 8/2012 | Agnoli et al. |
| 2012/0214444 A1 | 8/2012 | McBride et al. |
| 2012/0216242 A1 | 8/2012 | Uner et al. |
| 2012/0218885 A1 | 8/2012 | Abel et al. |
| 2012/0221789 A1 | 8/2012 | Felter |
| 2012/0224691 A1 | 9/2012 | Purohit |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0240183 A1 | 9/2012 | Sinha |
| 2012/0257249 A1 | 10/2012 | Natarajan |
| 2012/0259964 A1 | 10/2012 | Lin et al. |
| 2012/0263166 A1 | 10/2012 | Cho et al. |
| 2012/0266203 A1 | 10/2012 | Elhadad et al. |

(56) References Cited

U.S. PATENT DOCUMENTS

| | | | |
|---|---|---|---|
| 2012/0284290 A1* | 11/2012 | Keebler | G06F 17/3089 707/756 |
| 2012/0284638 A1 | 11/2012 | Cutler et al. | |
| 2012/0284664 A1 | 11/2012 | Zhao | |
| 2012/0291011 A1 | 11/2012 | Quine | |
| 2012/0296790 A1 | 11/2012 | Robb | |
| 2012/0309540 A1 | 12/2012 | Holme et al. | |
| 2012/0311157 A1 | 12/2012 | Erickson et al. | |
| 2012/0311499 A1 | 12/2012 | Dellinger et al. | |
| 2012/0311725 A1* | 12/2012 | Schleifer | G06F 21/6218 726/29 |
| 2012/0317239 A1 | 12/2012 | Mulder et al. | |
| 2012/0317487 A1 | 12/2012 | Lieb et al. | |
| 2012/0328259 A1* | 12/2012 | Seibert, Jr. | G06F 17/212 386/230 |
| 2012/0331177 A1 | 12/2012 | Jensen | |
| 2012/0331441 A1 | 12/2012 | Adamson | |
| 2013/0007245 A1 | 1/2013 | Malik et al. | |
| 2013/0007471 A1 | 1/2013 | Grab et al. | |
| 2013/0007894 A1 | 1/2013 | Dang et al. | |
| 2013/0013560 A1 | 1/2013 | Goldberg et al. | |
| 2013/0014023 A1 | 1/2013 | Lee et al. | |
| 2013/0042106 A1 | 2/2013 | Persaud et al. | |
| 2013/0054634 A1 | 2/2013 | Chakraborty et al. | |
| 2013/0055127 A1 | 2/2013 | Saito et al. | |
| 2013/0067232 A1 | 3/2013 | Cheung et al. | |
| 2013/0073403 A1 | 3/2013 | Tuchman et al. | |
| 2013/0073621 A1 | 3/2013 | Waddoups et al. | |
| 2013/0080765 A1 | 3/2013 | Mohanty et al. | |
| 2013/0080919 A1 | 3/2013 | Kiang et al. | |
| 2013/0110565 A1 | 5/2013 | Means, Jr. et al. | |
| 2013/0110961 A1 | 5/2013 | Jadhav | |
| 2013/0117226 A1 | 5/2013 | Jain et al. | |
| 2013/0117337 A1 | 5/2013 | Dunham | |
| 2013/0117376 A1 | 5/2013 | Filman et al. | |
| 2013/0124458 A1 | 5/2013 | Barreto et al. | |
| 2013/0124638 A1 | 5/2013 | Barreto et al. | |
| 2013/0124984 A1 | 5/2013 | Kuspa | |
| 2013/0138608 A1 | 5/2013 | Smith | |
| 2013/0138615 A1 | 5/2013 | Gupta et al. | |
| 2013/0151690 A1 | 6/2013 | Shah et al. | |
| 2013/0159411 A1 | 6/2013 | Bowen | |
| 2013/0163289 A1 | 6/2013 | Kim et al. | |
| 2013/0167253 A1 | 6/2013 | Seleznev et al. | |
| 2013/0179947 A1 | 7/2013 | Kline, III et al. | |
| 2013/0185347 A1 | 7/2013 | Romano | |
| 2013/0185452 A1 | 7/2013 | Burckart et al. | |
| 2013/0185558 A1 | 7/2013 | Seibert et al. | |
| 2013/0191339 A1 | 7/2013 | Haden et al. | |
| 2013/0198600 A1 | 8/2013 | Lockhart et al. | |
| 2013/0212067 A1 | 8/2013 | Piasecki et al. | |
| 2013/0212486 A1 | 8/2013 | Joshi et al. | |
| 2013/0218978 A1 | 8/2013 | Weinstein et al. | |
| 2013/0219176 A1* | 8/2013 | Akella | H04L 63/0815 713/165 |
| 2013/0226876 A1 | 8/2013 | Gati et al. | |
| 2013/0227522 A1 | 8/2013 | Lerum et al. | |
| 2013/0239049 A1 | 9/2013 | Perrodin et al. | |
| 2013/0246901 A1 | 9/2013 | Massand | |
| 2013/0246932 A1 | 9/2013 | Zaveri et al. | |
| 2013/0254699 A1 | 9/2013 | Bashir et al. | |
| 2013/0262210 A1 | 10/2013 | Savage et al. | |
| 2013/0262862 A1 | 10/2013 | Hartley | |
| 2013/0268480 A1 | 10/2013 | Dorman | |
| 2013/0268491 A1 | 10/2013 | Chung et al. | |
| 2013/0268999 A1 | 10/2013 | Kiang et al. | |
| 2013/0275398 A1 | 10/2013 | Dorman et al. | |
| 2013/0275429 A1 | 10/2013 | York et al. | |
| 2013/0275509 A1 | 10/2013 | Micucci et al. | |
| 2013/0282658 A1 | 10/2013 | Besen et al. | |
| 2013/0282830 A1 | 10/2013 | Besen et al. | |
| 2013/0283106 A1 | 10/2013 | King et al. | |
| 2013/0304679 A1 | 11/2013 | Fleming et al. | |
| 2013/0304694 A1 | 11/2013 | Barreto et al. | |
| 2013/0304697 A1 | 11/2013 | Movida | |
| 2013/0305039 A1 | 11/2013 | Gauda | |
| 2013/0311894 A1* | 11/2013 | Rexer | G06Q 10/10 715/741 |
| 2013/0325803 A1 | 12/2013 | Akirav et al. | |
| 2013/0326344 A1 | 12/2013 | Masselle et al. | |
| 2014/0006357 A1 | 1/2014 | Davis et al. | |
| 2014/0006465 A1 | 1/2014 | Davis et al. | |
| 2014/0007205 A1 | 1/2014 | Oikonomou | |
| 2014/0013112 A1 | 1/2014 | Cidon et al. | |
| 2014/0019497 A1 | 1/2014 | Cidon et al. | |
| 2014/0019498 A1 | 1/2014 | Cidon et al. | |
| 2014/0032489 A1 | 1/2014 | Hebbar et al. | |
| 2014/0032616 A1 | 1/2014 | Nack | |
| 2014/0033277 A1 | 1/2014 | Xiao et al. | |
| 2014/0033291 A1 | 1/2014 | Liu | |
| 2014/0033324 A1 | 1/2014 | Kiang et al. | |
| 2014/0040182 A1 | 2/2014 | Gilder et al. | |
| 2014/0040206 A1 | 2/2014 | Ramakrishnan et al. | |
| 2014/0047509 A1 | 2/2014 | Bhogal et al. | |
| 2014/0052939 A1 | 2/2014 | Tseng et al. | |
| 2014/0059002 A1 | 2/2014 | Lockhart et al. | |
| 2014/0059217 A1 | 2/2014 | Pizurica | |
| 2014/0068589 A1 | 3/2014 | Barak | |
| 2014/0074629 A1 | 3/2014 | Rathod | |
| 2014/0082071 A1 | 3/2014 | Rexer | |
| 2014/0129632 A1* | 5/2014 | Sutton | G06Q 50/01 709/204 |
| 2014/0149461 A1* | 5/2014 | Wijayaratne | G06F 21/6236 707/785 |
| 2014/0150023 A1 | 5/2014 | Gudorf et al. | |
| 2014/0156373 A1 | 6/2014 | Roberts et al. | |
| 2014/0172595 A1 | 6/2014 | Beddow et al. | |
| 2014/0172783 A1 | 6/2014 | Suzuki et al. | |
| 2014/0172799 A1 | 6/2014 | Dorman | |
| 2014/0188798 A1 | 7/2014 | Mackenzie et al. | |
| 2014/0195485 A1 | 7/2014 | Dorman | |
| 2014/0201138 A1 | 7/2014 | Dorman et al. | |
| 2014/0201145 A1 | 7/2014 | Dorman et al. | |
| 2014/0215303 A1* | 7/2014 | Grigorovitch | G06F 17/212 715/229 |
| 2014/0223423 A1 | 8/2014 | Alsina et al. | |
| 2014/0230011 A1* | 8/2014 | Drewry | G06F 21/6218 726/1 |
| 2014/0244600 A1 | 8/2014 | Schmidt et al. | |
| 2014/0258155 A1* | 9/2014 | Suryanarayanan | H04L 63/10 705/318 |
| 2014/0258350 A1* | 9/2014 | Duval | G06F 17/30174 707/829 |
| 2014/0278457 A1* | 9/2014 | Weiler | G06Q 10/00 705/2 |
| 2014/0280605 A1 | 9/2014 | Zhang | |
| 2014/0337291 A1 | 11/2014 | Dorman et al. | |
| 2014/0337482 A1 | 11/2014 | Houston et al. | |
| 2014/0337491 A1 | 11/2014 | Barreto et al. | |
| 2014/0344456 A1 | 11/2014 | Buzbee et al. | |
| 2014/0359085 A1* | 12/2014 | Chen | H04L 41/0803 709/220 |
| 2014/0359286 A1 | 12/2014 | Wen et al. | |
| 2014/0372376 A1 | 12/2014 | Smith et al. | |
| 2014/0379647 A1 | 12/2014 | Smith et al. | |
| 2014/0379760 A1* | 12/2014 | Martin | G06Q 10/10 707/805 |
| 2015/0019723 A1 | 1/2015 | Kweon et al. | |
| 2015/0039556 A1 | 2/2015 | Mackenzie et al. | |
| 2015/0154156 A1* | 6/2015 | Meyers, Jr. | G06F 17/212 715/205 |
| 2015/0186668 A1 | 7/2015 | Whaley et al. | |
| 2015/0237406 A1 | 8/2015 | Ochoa et al. | |
| 2015/0339113 A1 | 11/2015 | Dorman et al. | |
| 2016/0044040 A1* | 2/2016 | Caffary, Jr. | G06F 21/6218 726/4 |
| 2016/0350326 A1* | 12/2016 | Simonetti | H04L 67/1095 |

FOREIGN PATENT DOCUMENTS

| | | |
|---|---|---|
| CN | 102264063 A | 11/2011 |
| EP | 0348614 A2 | 1/1990 |
| EP | 0921661 A2 | 6/1999 |

(56) References Cited

FOREIGN PATENT DOCUMENTS

| | | |
|---|---|---|
| EP | 1349088 | 10/2003 |
| EP | 1933242 A1 | 6/2008 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-2002019128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 A1 | 11/2013 |

OTHER PUBLICATIONS

Ivens, "Configuring Offline Files," Apr. 21, 2002, Windows IT Pro, pp. 1-5.
U.S. Appl. No. 14/146,658, filed Jan. 2, 2014, Race Condition Handling in a System Which Incrementally Updates Clients With Events That Occurred in a Cloud-Based Collaboration Platform.
Ivens, "Using and Troubleshooting Offline Files," Jun. 23, 2002, Windows IT Pro, pp. 1-5.
Ivens, "Using and Troubleshooting Offline Files," Jun. 23, 2002, Windows IT Pro, Figures 1 and 2, 2 pages.
"How-to Geek, How to Sync Specific Folders With Dropbox," originally written on Jun. 1, 2010 and archived version retrieved from WaybackMachine as published online on Jul. 4, 2014 at http://www.howtogeek.com/howto/18285/sync-specific-folders-with-dropbox, 5 pages.
Exam Report for GB1413461.3; Applicant: Box, Inc., dated Aug. 21, 2015, 6 pages.
Fu et al., "Efficient and Fine-Grained Sharing of Encrypted Files," Quality of Service (IWQos), 2010 18th International Workshop on year 2010, pp. 1-2.
Exam Report for GB1220644.7, Applicant: Box, Inc., dated May 1, 2015, 4 pages.
International Search Report and Written Opinion for PCT/US2008/012973 dated Apr. 30, 2009, pp. 1-11.
Supplementary European Search Report European Application No. EP 08 85 8563 dated Jun. 20, 2011 pp. 1-5.
International Search Report and Written Opinion for PCT/US2011/039126 dated Oct. 6, 2011, pp. 1-13.
Partial International Search Report for PCT/US2011/041308 dated Feb. 27, 2012, pp. 1-2.
International Search Report and Written Opinion for PCT/US2011/056472 dated Jun. 22, 2012, pp. 1-12.
Langfeld L. et al., "Microsoft SharePoint 2003 Unleashed," Chapters 11 and 15, Jun. 2004, pp. 403-404, 557-561, 578-581.
International Search Report and Written Opinion for PCT/US2011/041308 dated Jul. 2, 2012, pp. 1-16.
International Search Report and Written Opinion for PCT/US2011/060875 dated Oct. 30, 2012, pp. 1-10.
Internet Forums, http://web.archive.org/web/20100528195550/http://en.wikipedia.org/wiki/Internet_forums, Wikipedia, May 30, 2010, pp. 1-20.
Yahoo! Groups, http://web.archive.org/web/20090320101529/http://en.wikipedia.org/wiki/Yahoo!_Groups, Wikipedia, Mar. 20, 2009, pp. 1-6.
Wiki, http://web.archive.org/web/20100213004936/http://en.wikipedia.org/wiki/Wiki, Feb. 13, 2010, pp. 1-16.
Conner, "Google Apps: The Missing Manual," published by O'Reilly Media, May 27, 2008, 24 pages.
Cisco, "FTP Load Balancing on ACE in Routed Mode Configuration Example," DocWiki, Jun. 2011, 7 pages.
Palmer, "Load Balancing FTP Servers," BlogNav, Oct. 2008, 2 pages.
Wayback, "Wayback machine," Wayback, Jun. 1, 2011, 1 page.
"Understanding Metadata," National Information Standards Organization, NISO Press, 2004, 20 pages.
International Search Report and Written Opinion for PCT/US2012/056955, Applicant: Box, Inc., dated Mar. 27, 2013, pp. 1-11.
International Search Report and Written Opinion for PCT/US2011/047530, Applicant: Box, Inc., dated Mar. 22, 2013, pp. 1-10.
International Search Report and Written Opinion for PCT/US2012/065617, Applicant: Box, Inc., dated Mar. 29, 2013, 9 pages.
International Search Report and Written Opinion for PCT/US2012/067126, Applicant: Box, Inc., dated Mar. 29, 2013, 10 pages.
International Search Report and Written Opinion for PCT/US2012/063041, Applicant: Box, Inc., dated Mar. 29, 2013, 12 pages.
International Search Report and Written Opinion for PCT/US2011/057938, Applicant: Box, Inc., dated Mar. 29, 2013, 10 pages.
Parr, "Google Docs Improves Commenting, Adds E-mail Notifications," Apr. 16, 2011, mashable.com, pp. 1-6.
"Microsoft Office SharePoint 2007 User Guide," Feb. 16, 2010, pp. 1-48.
Lars, "35 Very Useful Online Tools for Improving your project Management and Team Collaboration," Apr. 31, 2010, tripwiremagazine.com, pp. 1-32.
International Search Report and Written Opinion for PCT/US2012/070366, Applicant: Box, Inc., dated Apr. 24, 2013, 10 pages.
"How-to Geek, How to Sync Specific Folders With Dropbox," downloaded from the internet http://www.howtogeek.com, Apr. 23, 2013, 5 pages.
International Search Report and Written Opinion for PCT/US2013/020267, Applicant: Box, Inc., dated May 7, 2013, 10 pages.
International Search Report and Written Opinion for PCT/US2013/034662, Applicant: Box, Inc., dated May 31, 2013, 10 pages.
Exam Report for GB1306011.6, Applicant: Box, Inc. dated Apr. 18, 2013, 8 pages.
Exam Report for GB1300188.8, Applicant: Box, Inc. dated May 31, 2013, 8 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
Exam Report for EP13158415.3, Applicant: Box, Inc. dated Jun. 4, 2013, 8 pages.
International Search Report and Written Opinion for PCT/US2013/029520, Applicant: Box, Inc., dated Jun. 26, 2013, 10 pages.
International Search Report and Written Opinion for PCT/US2013/023889, Applicant: Box, Inc., dated Jun. 24, 2013, 13 pages.
International Search Report and Written Opinion for PCT/US2013/035404, Applicant: Box, Inc., dated Jun. 26, 2013, 11 pages.
International Search Report and Written Opinion for PCT/US2013/039782, Applicant: Box, Inc., dated Aug. 28, 2013, 15 pages.
Exam Report for GB1313559.5, Applicant: Box, Inc., dated Aug. 22, 2013, 19 pages.
Exam Report for GB1310666.1, Applicant: Box, Inc. dated Aug. 30, 2013, 10 pages.

(56) References Cited

OTHER PUBLICATIONS

Google Docs, http://web.Archive.org/web/20100413105758/http://en.wikipedia.org/wiki/Google_docs, Apr. 13, 2010, 6 pages.
Exam Report for GB1316533.7, Applicant: Box, Inc. dated Oct. 8, 2013, 9 pages.
Exam Report for GB1309209.3, Applicant: Box, Inc. dated Oct. 30, 2013, 11 pages.
"Quickoffice Enhances Android Mobile office Application for Improved Productivity on latest Smartphone and Table Devices," QuickOffice Press Release, Nov. 21, 2011, QuickOffice Inc., 2 pages.
"PaperPort," Wikipedia article (old revision), published May 19, 2012, Wikipedia Foundation, 2 pages.
"PaperPort Professional 14," PC Mag. Com review, published Feb. 2012, Ziff Davis, Inc., 8 pages.
"QuickOffice," Wikipedia Article (old revision), published May 9, 2012, Wikipedia Foundation, 2 pages.
Exam Report for GB1316532.9, Applicant: Box, Inc. dated Oct. 31, 2013, 10 pages.
Gedymin, "Cloud computing with an emphasis on Google App Engine," Master Final Project, Sep. 2011, 146 pages.
Exam Report for GB1317600.3, Applicant: Box, Inc. dated Nov. 21, 2013, 8 pages.
Exam Report for EP13168784.0, Applicant: Box, Inc. dated Nov. 21, 2013, 7 pages.
Exam Report for GB1316971.9, Applicant: Box, Inc. dated Nov. 26, 2013, 10 pages.
Exam Report for GB1312095.1, Applicant: Box, Inc. dated Dec. 12, 2013, 7 pages.
Exam Report for GB1318373.6, Applicant: Box, Inc. dated Dec. 17, 2013, 4 pages.
Exam Report for GB1312874.9, Applicant: Box, Inc. dated Dec. 20, 2013, 11 pages.
Exam Report for GB1320902.8, Applicant: Box, Inc. dated Dec. 20, 2013, 6 pages.
Patent Court Document of Approved Judgment for GB0602349.3 and GB0623571.7; Mar. 3, 2009, 17 pages.
Exam Report for GB1311417.8, Applicant: Box, Inc. dated Dec. 23, 2013, 5 pages.
International Search Report and Written Opinion for PCT/US2013/034765, Applicant: Box, Inc., dated Jan. 20, 2014, 15 pages.
Exam Report for EP13185269.1, Applicant: Box, Inc. dated Jan. 28, 7 pages.
Exam Report for GB1314771.5, Applicant: Box, Inc. dated Feb. 17, 2014, 7 pages.
Exam Report for GB1308842.2, Applicant: Box, Inc. dated Mar. 10, 2014, 4 pages.
Burns, "Developing Secure Mobile Applications for Android," Oct. 2008, Version 1.0, 1-28 pages.
Search Report for EP 11729851.3, Applicant: Box, Inc. dated Feb. 7, 2014, 9 pages.
Comes, "MediaXchange User's Manual," Version 1.15.15, Feb. 1, 2009, pp. 1-90.
"Average Conversion Time for a D60 RAW file?" http://www.dpreview.com, Jul. 22, 2002, 4 pages.
Exam Report for GB1312264.3, Applicant: Box, Inc. dated Mar. 24, 2014, 7 pages.
Search Report for EP14153783.7, Applicant: Box, Inc. dated Apr. 7, 2014, 6 pages.
John et al., "Always Sync Support Forums—View topic—Allway sync funny behavior," Allway Sync Support Forum at http://sync-center.com, Mar. 28, 2011, XP055109680, 2 pages.
Search Report for EP14151588.2, Applicant: Box, Inc. dated Apr. 15, 2014, 12 pages.
Search Report for EP13187217.8, Applicant: Box, Inc. dated Apr. 15, 2014, 12 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.

Walker, "PDF.js project meeting notes," retrieved from the internet, http://groups.google.com, May 15, 2014, 1 page.
Sommerer, "Presentable Document Format: Improved On-demand PDF to HTML Conversion," retrieved from the internet, http://research.microsoft.com, Nov. 2004, 8 pages.
"Tulsa TechFest 2012—Agenda," retrieved from the website, http://web.archive.org, Oct. 2, 2012, 2 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Cohen, "Debating the Definition of Cloud Computing Platforms," retrieved from the internet, http://forbes.com, Feb. 3, 2014, 7 pages.
Partial Search Report for EP131832800, Applicant: Box, Inc. dated May 8, 2014, 5 pages.
Search Report for EP141509422, Applicant: Box, Inc. dated May 8, 2014, 7 pages.
Tulloch et al., "Windows Vista Resource Kit," Apr. 8, 2007, Microsoft Press, XP055113067, 6 pages.
"Revolving sync conflicts; frequently asked questions," Microsoft Tech Support, Jul. 16, 2012, retrieved from the Internet: http://web.archive.org/web, 2 pages.
Pyle et al., "How to enable Event logging for Offline Files (Client Side Caching) in Windows Vista," Feb. 18, 2009, retrieved from the internet: http://blogs.technet.com, 3 pages.
Duffy, "The Best File-Syncing Services," pcmag.com, retrieved from the internet: http://www.pcmag.com, Sep. 28, 2012, 7 pages.
"Troubleshoot sync problems," Microsoft Tech Support: May 2, 2012, retrieved from the internet, http://web. Archive.org/web, 3 pages.
Exam Report for GB1318792.7, Applicant: Box, Inc. dated May 22, 2014, 2 pages.
Exam Report for EP13177108.1, Applicant: Box, Inc. dated May 26, 2014, 6 pages.
Exam Report for GB1410569.6 Applicant: Box, Inc. dated Jul. 11, 2014, 9 pages.
Extended Search Report for EP131832800, Applicant: Box, Inc. dated Aug. 25, 2014, 7 pages.
Extended Search Report for EP141509422, Applicant: Box, Inc. dated Aug. 26, 2014, 12pages.
Search Report for EP 13189144.2 Applicant: Box, Inc. dated Sep. 1, 2014, 9 pages.
Exam Report for GB1312874.9 Applicant: Box, Inc. dated Sep. 26, 2014, 2 pages.
Exam Report for GB1415126.0 Applicant: Box, Inc. dated Oct. 2, 2014, 8 pages.
Exam Report for GB1415314.2 Applicant: Box, Inc. dated Oct. 7, 2014, 6 pages.
Exam Report for GB1309209.3 Applicant: Box, Inc. dated Oct. 7, 2014, 3 pages.
Exam Report for GB1315232.7 Applicant: Box, Inc. dated Oct. 9, 2014, 5 pages.
Exam Report for GB1318789.3 Applicant: Box, Inc. dated Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. dated Nov. 7, 2014, 6 pages.
Exam Report for GB1311417.8 Applicant: Box, Inc. dated Nov. 7, 2014, 2 pages.
Exam Report for GB1311421.0 Applicant: Box, Inc. dated Nov. 7, 2014, 4 pages.
Exam Report for GB1316682.2 Applicant: Box, Inc. dated Nov. 19, 2014, 6 pages.
Exam Report for GB1312095.1 Applicant: Box, Inc. dated Nov. 19, 2014, 5 pages.
Exam Report for GB1313559.5 Applicant: Box, Inc. dated Nov. 4, 2014, 2 pages.
User's Guide for SMART Board Software for Windows, published Dec. 2004, 90 pages.

(56) References Cited

OTHER PUBLICATIONS

Zambonini et al., "Automated Measuring of Interaction with User Interfaces," Published as WO2007113573 Oct. 2007, 19 pages.
Exam Report for GB1309209.3 Applicant: Box, Inc. dated Jan. 19, 2015, 6 pages.
"Agilewords—How to Request Approval," YouTube, http://www.youtube.com/watch?v=3-Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.
Exam Report for EP 13177108.1, Applicant: Box, Inc. dated Feb. 17, 2015, 6 pages.
Exam Report for GB1312264.3 Applicant: Box, Inc. dated Jan. 30, 2015, 5 pages.
Exam Report for GB1312874.9 Applicant: Box, Inc. dated Feb. 10, 2015, 7 pages.
Exam Report for GB1316685.5 Applicant: Box, Inc. dated Feb. 17, 2015, 5 pages.
Exam Report for EP 13185269.1, Applicant: Box, Inc. dated Feb. 13, 2015, 8 pages.
Exam Report for GB1316532.9 Applicant: Box, Inc. dated Mar. 27, 2015, 6 pages.
Burney, "How to Move Document from Your Computer to Your iPad and Back Again," May 31, 2011, 3 pages.
Exam Report for GB1311459.0 Applicant: Box, Inc. dated Aug. 19, 2013, 6 pages.
"Dropbox: Sync only specific folders," posted on Feb. 9, 2012, available online at http://www.tech-recipes.com/rx/20865/dropbox-sync-only-specific-folders/, 4 pages.
Exam Report for GB1316532.9; Applicant: Box, Inc., dated Mar. 8, 2016, 3 pages.
Cicnavi, "Offline Files in XP," Nov. 29, 2010, UtilizeWindows, pp. 1-6.
Kretzschmar et al., "Functional Components for a Security Manager within Future Inter-Cloud environments," Copyright 2011 IEEE, 5 pages.
Li et al., "CloudVO: Building a Secure Virtual Organization for Multiple Clouds Collaboration," Copyright 2010 IEEE, 6 pages.
Mont et al., "Risk Assessment and Decision Support for Security Policies and Related Enterprise Operational Processes," Copyright 2011 IEEE, 4 pages.
TaheriMonfared et al., "Monitoring Intrusions and Security Breaches in Highly Distributed Cloud Environments," Copyright 2011 IEEE, 6 pages.
Vimercati et al., "Managing and Accessing Data in the Cloud: Privacy Risks and Approaches," Copyright 2012 CRiSIS, 9 pages.
Wang et al., "Data Leakage Mitigation for Discretionary Access Control in Collaboration Clouds," Copyright 2011 ACM, 10 pages.
U.S. Appl. No. 61/702,662, filed Sep. 18, 2012, Sandboxing Individual Applications to Specific User Folders in a Cloud-Based Service.
U.S. Appl. No. 13/830,016, filed Mar. 14, 2013, Sandboxing Individual Applications to Specific User Folders in a Cloud-Based Service.
U.S. Appl. No. 61/620,568, filed Apr. 5, 2012, Synchronization Client Selective Subfolder Syncing in a Cloud-Based Environment.
U.S. Appl. No. 13/856,607, filed Apr. 4, 2013, Method and Apparatus for Selective Subfolder Synchronization in a Cloud-Based Environment.
U.S. Appl. No. 13/954,680, filed Jul. 30, 2013, System and Method for Advanced Control Tools for Administrators in a Cloud-Based Service.
U.S. Appl. No. 62/005,659, filed May 20, 2014, Enterprise Admin Selectively Imposed Sync Permissions at a Client End or Client Device.
U.S. Appl. No. 62/006,799, filed Jun. 24, 2014, Enterprise Administrator Selectively Imposed Sync Permissions at a Client End or a Client Device.
U.S. Appl. No. 62/044,920, filed May 20, 2014, Synchronization Permissions Selectively Imposed by an Enterprise Admin on Files and/or Folders at a Client Device.
U.S. Appl. No. 61/505,999, filed Jul. 11, 2011, Desktop Application for Access and Interaction with Workspaces in a Cloud-Based Content Management System and Synchronization Mechanisms Thereof.
U.S. Appl. No. 13/282,427, filed Oct. 26, 2011, Desktop Application for Access and Interaction with Workspaces in a Cloud-Based Content Management System and Synchronization Mechanisms Thereof.
U.S. Appl. No. 61/564,425, filed Nov. 29, 2011, Mobile Platform Folder Synchronization and Offline Synchronization.
U.S. Appl. No. 61/568,430, filed Dec. 8, 2011, Mobile Platform File and Folder Selection Functionalities for Offline Access and Synchronization.
U.S. Appl. No. 13/689,544, filed Nov. 29, 2012, Mobile Platform File and Folder Selection Functionalities for Offline Access and Synchronization.
U.S. Appl. No. 61/560,685, filed Nov. 16, 2011, Temporal and Spatial Processing and Tracking of Events in a Web-Based Collaboration Environment for Asynchronous Delivery in an Ordered Fashion.
U.S. Appl. No. 13/524,501, filed Jun. 15, 2012, Resource Effective Incremental Updating of a Remote Client With Events Which Occurred via a Cloud-Enabled Platform.
U.S. Appl. No. 13/526,437, filed Jun. 18, 2012, Managing Updates at Clients Used by a User to Access a Cloud-Based Collaboration Service.
U.S. Appl. No. 14/658,423, filed Mar. 16, 2015, Managing Updates at Clients Used by a User to Access a Cloud-Based Collaboration Service.
U.S. Appl. No. 61/620,554, filed Apr. 5, 2012, Device Pinning Capability for Enterprise Cloud Service and Storage Accounts.
U.S. Appl. No. 13/493,922, filed Jun. 11, 2012, Device Pinning Capability for Enterprise Cloud Service and Storage Accounts.
U.S. Appl. No. 61/622,868, filed Apr. 11, 2012, Web and Desktop Client Synchronization of Mac Packages With a Cloud-Based Platform.
U.S. Appl. No. 13/618,993, filed Sep. 14, 2012, Cloud Service Enabled to Handle a Set of Files Depicted to a User as a Single File in a Native Operating System.
U.S. Appl. No. 61/643,116, filed May 4, 2012, Hbase Redundancy Implementation for Action Log Framework.
U.S. Appl. No. 13/890,172, filed May 8, 2013, Repository Redundancy Implementation of a System Which Incrementally Updates Clients With Events That Occurred via a Cloud-Enabled Platform.
U.S. Appl. No. 13/888,308, filed May 6, 2013, Repository Redundancy Implementation of a System Which Incrementally Updates Clients With Events That Occurred via a Cloud-Enabled Platform.
U.S. Appl. No. 61/693,521, filed Aug. 27, 2012, Backend Implementation of Synchronization Client Selective Subfolder Syncing in a Cloud-Based Environment.
U.S. Appl. No. 14/010,851, filed Aug. 27, 2013, Server Side Techniques for Reducing Database Workload in Implementing Selective Subfolder Synchronization in a Cloud-Based Environment.
U.S. Appl. No. 61/751,578, filed Jan. 11, 2013, Functionalities, Features, and User Interface of a Synchronization Client to a Cloud-Based Environment.
U.S. Appl. No. 14/153,726, filed Jan. 13, 2014, Functionalities, Features, and User Interface of a Synchronization Client to a Cloud-Based Environment.
U.S. Appl. No. 61/750,474, filed Jan. 9, 2013, File System Event Monitor and Event Filter Pipeline for a Cloud-Based Platform.
U.S. Appl. No. 14/149,586, filed Jan. 7, 2014, File System Monitoring in a System Which Incrementally Updates Clients With Events That Occurred in a Cloud-Based Collaboration Platform.
U.S. Appl. No. 61/753,761, Conflict Resolution, Retry Condition Management, and Handling of Problem Files for the Synchronization Client to a Cloud-Based Platform.

(56) References Cited

OTHER PUBLICATIONS

U.S. Appl. No. 14/158,626, Conflict Resolution, Retry Condition Management, and Handling of Problem Files for the Synchronization Client to a Cloud-Based Platform.
U.S. Appl. No. 61/739,296, filed Dec. 19, 2012, Synchronization of Read-Only Files/Folders by a Synchronization Client With a Cloud-Based Platform.
U.S. Appl. No. 14/135,311, filed Dec. 19, 2013, Method and Apparatus for Synchronization of Items With Read-Only Permissions in a Cloud-Based Environment.
U.S. Appl. No. 61/748,399, filed Jan. 2, 2013, Handling Action Log Framework Race Conditions for a Synchronization Client to a Cloud-Based Environment.
U.S. Appl. No. 14/146,658, filed Jan. 2, 2014, Race Condition Handling in a System Which Incrementally Updates Clients With Events That Occurred in a Cloud-Based Collaboration Platform.
U.S. Appl. No. 61/822,170, filed May 10, 2013, Identification and Handling of Items to be Ignored for Synchronization With a Cloud-Based Platform by a Synchronization Client.
U.S. Appl. No. 14/275,890, filed May 13, 2014, Identification and Handling of Items to be Ignored for Synchronization With a Cloud-Based Platform by a Synchronization Client.
U.S. Appl. No. 61/822,191, filed May 10, 2013, Systems and Methods for Depicting Item Synchronization With a Cloud-Based Platform by a Synchronization Client.
U.S. Appl. No. 14/275,401, filed May 12, 2014, Top Down Delete or Unsynchronization on Delete of and Depiction of Item Synchronization With a Synchronization Client to a Cloud-Based Platform.
U.S. Appl. No. 61/834,756, filed Jun. 13, 2013, Systems and Methods for Event Building, Collapsing, or Monitoring by a Synchronization Client of a Cloud-Based Platform.
U.S. Appl. No. 14/304,038, filed Jun. 13, 2014, Systems and Methods for Synchronization Event Building and/or Collapsing by a Synchronization Component of a Cloud-Based Platform.
U.S. Appl. No. 61/838,176, filed Jun. 21, 2013, Maintaining and Updating File System Shadows on a Local Device by a Synchronization Client of a Cloud-Based Platform.
U.S. Appl. No. 14/312,482, filed Jun. 23, 2014, Maintaining and Updating File System Shadows on a Local Device by a Synchronization Client of a Cloud-Based Platform.
U.S. Appl. No. 61/860,050, filed Jul. 30, 2013, Scalability Improvement in a System Which Incrementally Updates Clients With Events That Occurred in a Cloud-Based Collaboration Platform.
U.S. Appl. No. 14/194,091, filed Feb. 28, 2014, Scalability Improvement in a System Which Incrementally Updates Clients With Events That Occurred in a Cloud-Based Collaboration Platform.

\* cited by examiner

SYNCHRONIZATION OF PERMISSIONED CONTENT IN CLOUD-BASED ENVIRONMENTS

CROSS-REFERENCE TO RELATED APPLICATIONS

This application claims priority to and benefit from U.S. Provisional Patent Application Ser. No. 62/005,659 titled "ENTERPRISE ADMIN SELECTIVELY IMPOSED SYNC PERMISSIONS AT A CLIENT END OR CLIENT DEVICE" filed on May 30, 2014 and U.S. Provisional Patent Application Ser. No. 62/006,799 titled "ENTERPRISE ADMINISTRATOR SELECTIVELY IMPOSED SYNC PERMISSIONS AT A CLIENT END OR A CLIENT DEVICE" filed on Jun. 2, 2014; and U.S. Provisional Patent Application Ser. No. 62/044,920 titled "SYNCHRONIZATION PERMISSIONS SELECTIVELY IMPOSED BY AN ENTERPRISE ADMIN ON FILES AND/OR AT A CLIENT DEVICE" FILED ON Sep. 2, 2014. The aforementioned applications are expressly incorporated by reference herein.

BACKGROUND

A cloud-based collaboration and/or storage platform enables content (e.g., files and folders) to be accessed, viewed and/or edited by collaborators in the same group or enterprise using any client devices at the same time. Through a synchronization (sync) client of the cloud-based platform, collaborators can sync content between their desktops, laptops and mobile devices and their online folders on the cloud-based platform. The sync client enables any new or updated files and/or sub-folders in a folder marked for sync ("sync folder") to be automatically downloaded to the devices of users who are collaborators of that sync folder. Every edit or update made locally on a file in the sync folder is then automatically saved to the cloud-based platform via the sync client.

BRIEF DESCRIPTION OF DRAWINGS

The present embodiments are illustrated by way of example and are not intended to be limited by the figures of the accompanying drawings.

The same reference numbers and any acronyms identify elements or acts with the same or similar structure or functionality throughout the drawings and specification for ease of understanding and convenience.

DETAILED DESCRIPTION

Figure 1:
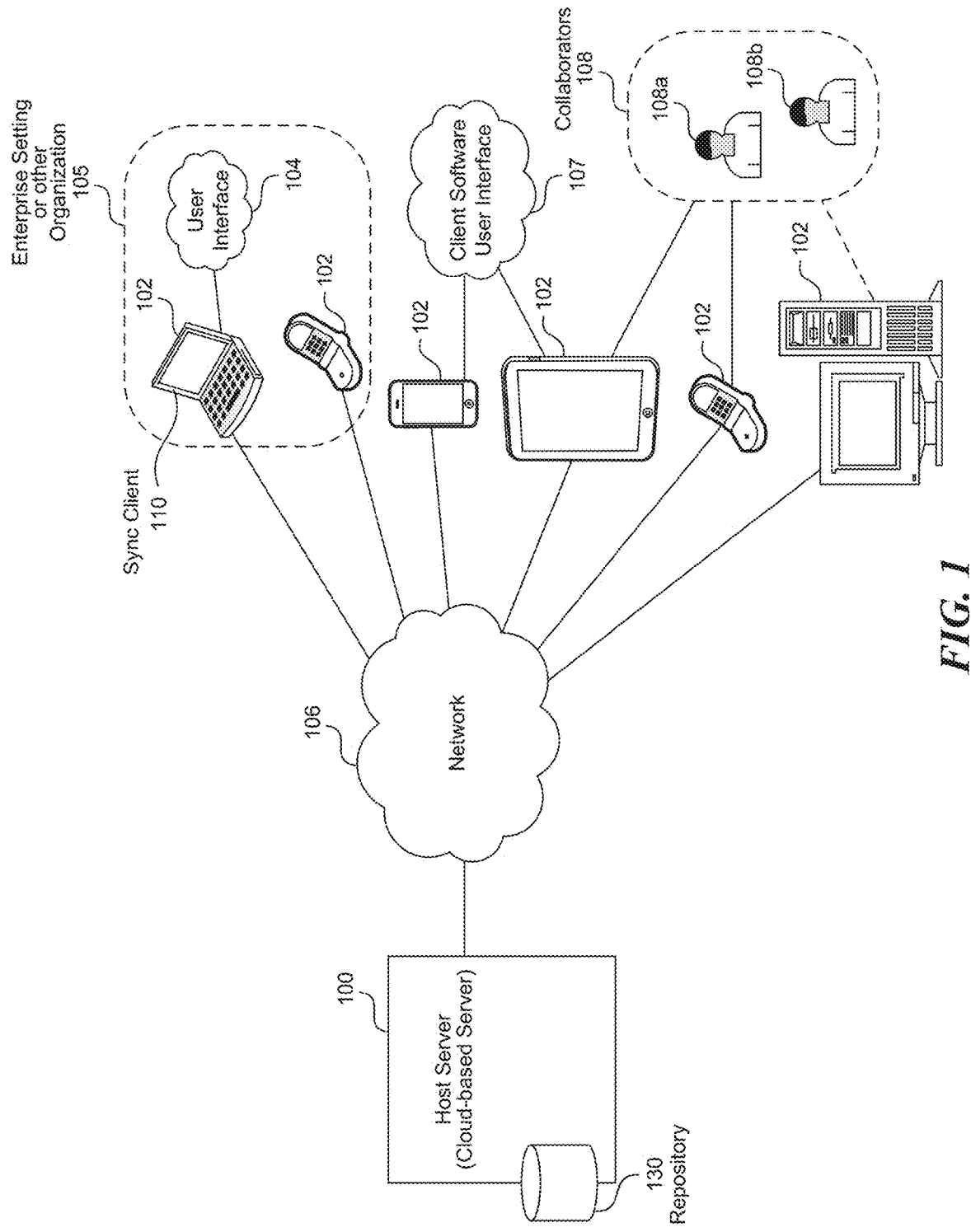
FIG. 1 depicts an example diagram of a system having a host server of a cloud-based service, collaboration and/or cloud storage accounts with capabilities that enable synchronization of items (e.g., files or folders) with permissions imposed by enterprise administrators ("admins") or enterprise content item owners in a cloud-based environment.

In a cloud-based collaboration and/or storage environment ("cloud-based environment") including a cloud-based server or host server, contents of a folder that is marked for synchronization (hereinafter "sync folder") can be downloaded from the cloud-based environment to one or more client devices of users (e.g., collaborators of the sync folder) using a sync client. Once downloaded, a user can locally modify the files (and/or sub-folders) in the sync folder. The modified files can then be automatically synced back to the cloud-based environment and from thereon, propagated to the client devices of other users.

An enterprise, as used herein, can be a conglomerate, an organization, a company, one or more divisions or units within a company or an organization, and/or the like. The enterprise has a set of users (e.g., employees). In some embodiments, one or more enterprises can utilize the facilities of the cloud-based environment. For example, enterprises can use store their documents and other content at a datastore or repository of the cloud-based server. An enterprise admin ("admin") of an organization can manage users and groups, view and edit all of the organization's files and folders, set permissions on files and folders, log in to any user's account within the organization, edit settings for the organization, run or access reports, manage storage allocations, and/or the like via a centralized console. For example, an admin can add or delete users (or user accounts) individually or upload users in bulk. Once a user has a user account for the enterprise, the user can, based on permissions, access and/or download documents stored at the remote datastore, upload documents to the remote datastore, share and/or collaborate on documents with other internal (e.g., users of the same enterprise) and/or external users (e.g., users outside of the enterprise), and/or the like.

In some embodiments, an enterprise admin may want users of an enterprise to be able to download and view all of the contents of a folder marked for synchronization ("sync folder"), but at the same time restrict them from modifying any of the items in the sync folder. This may be the case when the enterprise admin wants to ensure that all the users download and access the same file and discourage the users from modifying the file and uploading a modified version of the file, which could result in the modified version replacing the original version or creating multiple versions of the file. For example, a sales team of "ABC Design Company" may want users to download marketing content in "Marketing Folder" but may not want those users to edit that content and have the edited content synchronized to everybody else. Thus, to enable a one-way flow of content from the cloud-based environment to client devices and to ensure that the marketing content that is propagated is the most up to date version, the admin assign one or more permission attributes to a sync item (e.g., a file, a sub-folder and/or folder marked for synchronization). In various embodiments, different types of permissions can be imposed on sync items. Examples of permissions can include, but are not limited to enabling or disabling the ability to download, upload, edit, rename, delete, copy, print, move, create, tags, assign tasks, and/or the like. Such permissions can be imposed by the enterprise admin, workspace owner, and/or item owners.

In some embodiments, when a sync item having one or more permissions imposed thereon is downloaded to a client device, a component on the client device can monitor user interaction with the sync item and can detect when a non-permitted interaction occurs. For example, consider a sync folder that contains a PowerPoint file. The sync folder can have the following permission attributes set to true: can download and can delete and the following permission attributes set to false: can upload, can rename and can edit. In other words, users can download the sync folder and delete the sync folder or the PowerPoint file, but cannot edit, rename or upload the file or the sync folder to the cloud-based environment. In some embodiments, a sync client on the client device can detect the permission attributes and mark the sync folder and/or the PowerPoint file as a "permissioned" sync item based on the permission attributes. In some embodiments, the permissioned sync item can have an iconography associated with it that enables a user to see that the sync item has certain permissions associated with it. This could prevent the user from attempting to make changes to the permissioned sync item. In some embodiments, the sales folder and/or the sales report file can be marked by the sync client with "restricted" or "read-only" or other similar designation to enable the operating system and/or other applications on the client device to recognize that those items are restricted and disable the restricted features accordingly. For example, the PowerPoint file can be opened by the PowerPoint application on the client device, but because of the "read-only" designation (e.g., based on the permission setting), the PowerPoint application can disable editing features which would prevent the user from editing the file.

Even if editing is disabled for the PowerPoint file, it is possible for the user to make the file editable by clearing the permission attributes. Similarly, the user can move another item to the sync folder or create a new file in the sync folder, thereby changing the sync folder. To ensure that these changes do not get uploaded to the cloud-based environment, permission checks can be performed. Suppose the user edits the PowerPoint file. In some embodiments, the sync client can attempt to upload the edited file to the host server of the cloud-based environment. The host server can perform a permission check on the uploaded file to determine whether the edit to the file was permitted based on the permission attributes associated with the file or the sync folder. If the permission check fails, the host server can reject or fail to sync that file. In some embodiments, instead of syncing that file, the host server can rename the file (e.g., as a conflict copy) and store the file as a conflict copy in the host server so that the user does not lose the changes made to the file. The host server can then sync the original file back down to the client device so that the user has the original file on his or her client device.

In some embodiments, some or all of the process of validating a sync item (e.g., checking the permissions associated with the sync item) for syncing to the cloud-based server can be performed client-side based on the permission attributes (e.g., metadata) of the file. In some embodiments, the sync client, using a preflight application program interface (API) can perform a permission check on the file, without actually uploading the file. The preflight API can return a result indicating "permission denied" if the file includes changes that are not permitted based on the permission attributes associated with the file or the sync folder. In some embodiments, if the response is "permission denied," the sync client can repair the change, for example by undoing the change, downloading the original file, creating a conflict item or the like, based on the type of change made on the file and/or the sync folder.

In some embodiments, some problems can arise when repairing the changes to a file in a sync folder that can prevent the file from being downloaded from the host server to a client device. Those problems can also be detected and repaired by the sync client to enable one-way flow of synced content from the cloud-based environment to the client devices.

In some embodiments, the cloud-based environment can restrict folder access or restrict collaboration at the enterprise level. A permission at the folder and enterprise level means that a user is permitted to send collaboration invitations to only those people who are within the user's enterprise network. In some embodiments, enterprise admin or owners can use folder settings to mark any folder as "safe" to implement the permission. A folder that is marked safe can be associated with a visible indication or iconography. In some embodiments, when the user is inside of a folder that includes internal and external collaborators, the external collaborators can be identified in that environment so that the user knows that if the user puts content in that folder, that content would be visible to people inside and outside the enterprise.

When the user sends an invitation to invite other users to access a folder, the host server can check the folder settings associated with the folder to determine whether there are any permission attributes associated with the folder. If, for example, the permission indicates that collaboration with external users (e.g., users outside of a group or enterprise), the host server can check the domain names of the email address of the people being invited to see they match the domain name of the user. If any of the users being invited have a different domain name, the host server can skip inviting those users having different domain names. In some embodiments, the host server can perform a check every time a user accesses a folder against a list of collaborators to see if the user is in or out of the network and display their in/out of network status.

In some embodiments, when a user navigates inside a folder, the user can see the designation between people who are invited at various sublevels. For example, if the first-level folder is "Customer Visits" and Joe was only invited into this folder and not into the parent folder "Visits," the user can view that Joe was invited specifically at the "Customer Visits" folder level and Joe's access begins from the "Customer Visits" folder and not from the parent folder "Visits."

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others. Similarly, various requirements are described which can be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

FIG. 1 depicts an example diagram of a system having a host server 100 of a cloud-based service, collaboration and/or cloud storage accounts with capabilities that enable synchronization of items (e.g., files or folders) with permissions imposed by enterprise admins or enterprise content item owners in a cloud-based environment. In some embodiments, a synchronization (sync) server (not shown) can support synchronization of folders and/or files stored locally on a user's computer with folders stored by the host server 100 in repository 130.

The client devices 102 can be any system and/or device, and/or any combination of devices/systems that is able to establish a connection, including wired, wireless, cellular connections with another device, a server and/or other systems such as host server 100. Client devices 102 typically include a display and/or other output functionalities to present information and data exchanged between among the devices 102, and/or the host server 100.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a PDA, a smart phone (e.g., a BlackBerry device such as BlackBerry Z10/Q10, an iPhone, Nexus 4, etc.), a Treo, a handheld tablet (e.g. an iPad, iPad Mini, a Galaxy Note, Galaxy Note II, Xoom Tablet, Microsoft Surface, Blackberry PlayBook, Nexus 7, 10 etc.), a phablet (e.g., HTC Droid DNA, etc.), a tablet PC, a thin-client, a hand held console, a hand held gaming device or console (e.g., XBOX live, Nintendo DS, Sony PlayStation Portable, etc.), iOS powered watch, Google Glass, a Chromebook and/or any other portable, mobile, hand held devices, etc. running on any platform or any operating system (e.g., Mac-based OS (OS X, iOS, etc.), Windows-based OS (Windows Mobile, Windows 7, Windows 8, etc.), Android, Blackberry OS, Embedded Linux platforms, Palm OS, Symbian platform, Google Chrome OS, and the like. In one embodiment, the client devices 102, and host server 100 are coupled via a network 106. In some embodiments, the devices 102 and host server 100 can be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used by various users or collaborators collaborators 108) for accessing, through network 106, a web-based collaboration environment or online collaboration platform (e.g., hosted by the host server 100). The collaboration environment or platform can have one or more collective settings 105 for an enterprise or an organization that the users belong, and can provide an user interface 104 (e.g., via a webpage application (or a "web application") accessible by the web browsers of devices 102) for the users to access such platform under the settings 105. Additionally or alternatively, a client software 110 ("sync client") that is native to the cloud collaboration platform can be provided (e.g., through downloading from the host server 100 via the network 106) to run on the client devices 102 to provide cloud-based platform access functionalities. The users and/or collaborators can access the collaboration platform via a client software user interface 104, which can be provided by the execution of the client software on the devices 102.

The collaboration platform or environment hosts workspaces with work items that one or more users can access (e.g., view, edit, update, revise, comment, download, preview, tag, or otherwise manipulate). A work item can generally include any type of digital or electronic content that can be viewed or accessed via an electronic device (e.g., device 102). The digital content can include .pdf files, .doc, slides (e.g., PowerPoint slides), images, audio files, multimedia content, web pages, blogs, etc. A workspace can generally refer to any grouping of a set of digital content in the collaboration platform. The grouping can be created, identified, or specified by a user or through other means. This user can be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace can be the same or can vary among the users. Each user can have their own set of access rights to every piece of content in the workspace, or each user can be different access rights to different pieces of content. Access rights can be specified by a user associated with a workspace and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a workspace for other users to access (e.g., for viewing, editing, commenting, signing-off or otherwise manipulating). The user can login to the online platform and upload the document (or any other type of work item) to an existing workspace or to a new workspace. The document can be shared with existing users or collaborators in a workspace.

In general, network 106, over which the client devices 102 and the host server 100 communicate can be a cellular network, a telephonic network, an open network, such as the or a private network, such as an intranet and/or the extranet, or any combination or variation For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and can appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

In some embodiments, the host server 100 and/or the sync client 110 enables enterprise admins and/or content owners to selectively impose permissions on synced files and folders on client devices. The permissions on the sync items can prevent a user from taking certain actions on those items once they are downloaded to the user's client device from the host server. In some embodiments, even if the user takes certain actions on the sync items that are not permitted, the sync client 110 and/or the host server 100 can detect the changes that are inconsistent with or not permitted and reject those changes. The sync client 110 can also undo or repair the changes on the sync items. All of these actions ensure a one way flow of content from the host server 100 to the client device. This has the advantage of providing the most up to date content to users, with the host server 100 as the authoritative source of content. In some embodiments, by handling changes made locally that are not permitted or inconsistent with the permission settings, the sync client 110 can restore the changed files to their original form, without losing any local work and while reducing the amount of data transmitted back and forth between the client device and the host server 100.

Figure 2:
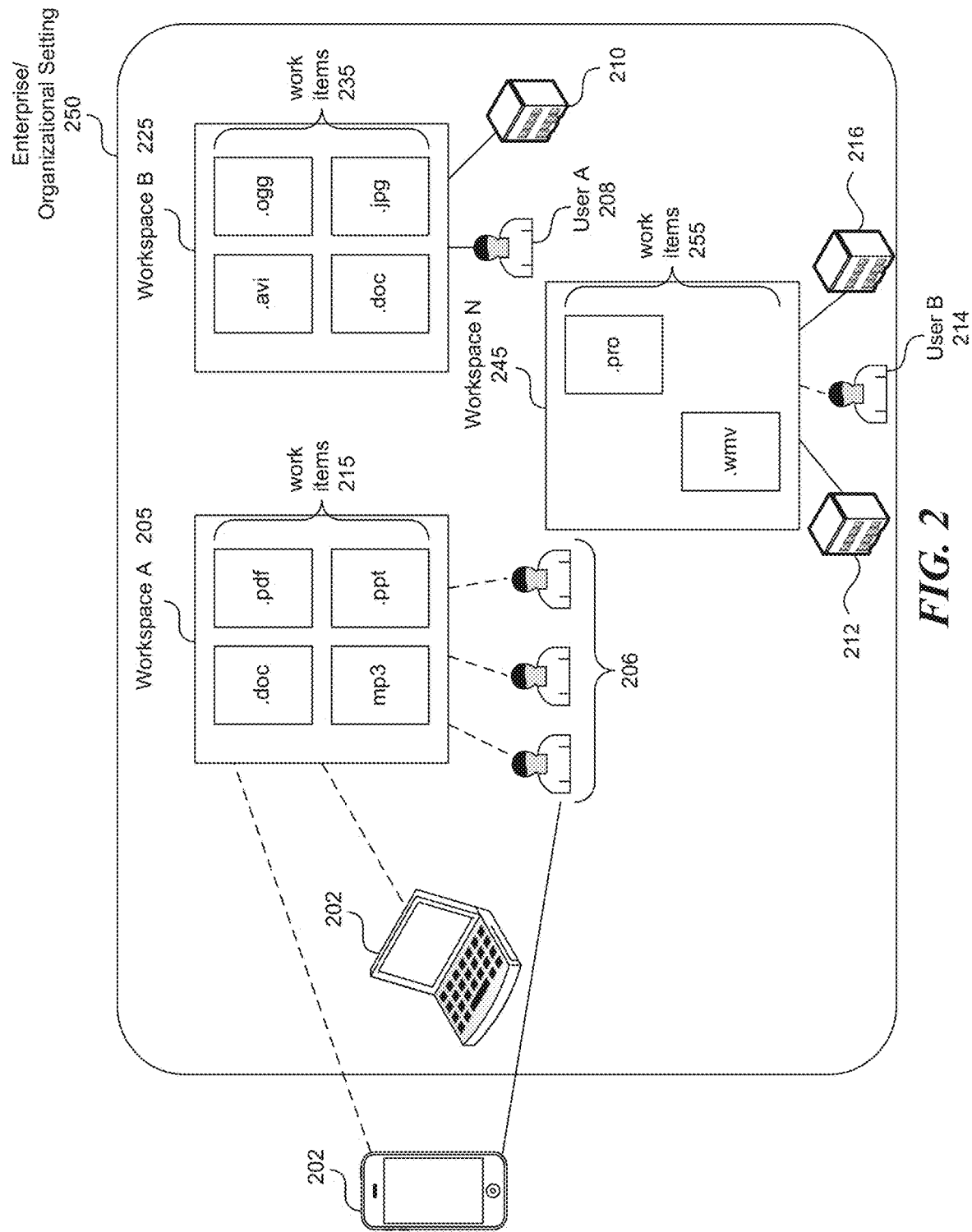
FIG. 2 depicts an example diagram of a web-based or online collaboration platform deployed in an enterprise or other organizational setting for organizing work items and workspaces.

FIG. 2 depicts an example diagram of a web-based or online collaboration platform deployed in an enterprise or other organizational setting 250 for organizing work items 215, 235, 255 and workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associate work items. For example, workspace A 205 can be associated with work items 215, workspace B 225 can be associated with work items 235, and workspace N can be associated with work items 255. The work items 215, 235, and 255 can be unique to each workspace but need not be. For example, a particular word document can be associated with only one workspace (e.g., workspace A 205) or it can be associated with multiple workspaces (e.g., Workspace A 205 and workspace B 225, etc.).

In general, each workspace has a set of users or collaborators associated with it. For example, workspace A 205 is associated with multiple users or collaborators 206. In some instances, workspaces deployed in an enterprise can be department specific. For example, workspace B can be associated with department 210 and some users shown as example user A 208 and workspace N 245 can be associated with departments 212 and 216 and users shown as example user B 214.

Each user associated with a workspace can generally access the work items associated with the workspace. The level of access will depend on permissions associated with the specific workspace, and/or with a specific work item. Permissions can be set for the workspace or set individually on a per work item basis. For example, the creator of a workspace (e.g., one of user A 208 who creates workspace B) can set one permission setting applicable to all work items 235 for other associated users and/or users associated with the affiliate department 210, for example. Creator user A 208 can also set different permission settings for each work item, which can be the same for different users, or varying for different users.

In each workspace A, B . . . N, when an action is performed on a work item by a given user or any other activity is detected in the workspace, other users in the same workspace can be notified (e.g., in real time or in near real time, or not in real time). Activities which trigger real time notifications can include, by way of example but not limitation, adding, deleting, or modifying collaborators in the workspace, uploading, downloading, adding, deleting a work item in the workspace, creating a discussion topic in the workspace.

In some embodiments, items or content downloaded or edited can cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 can be in the same workspace A 205 or the user can include a newly invited collaborator. Similarly, in the same user interface where discussion topics can be created in a workspace (e.g., workspace A, B or N, etc.), actionable events on work items can be created and/or delegated/assigned to other users such as collaborators of a given workspace 206 or other users. Through the same user interface, task status and updates from multiple users or collaborators can be indicated and reflected. In some instances, the users can perform the tasks review or approve or reject, etc.) via the same user interface.

Figure 3A:
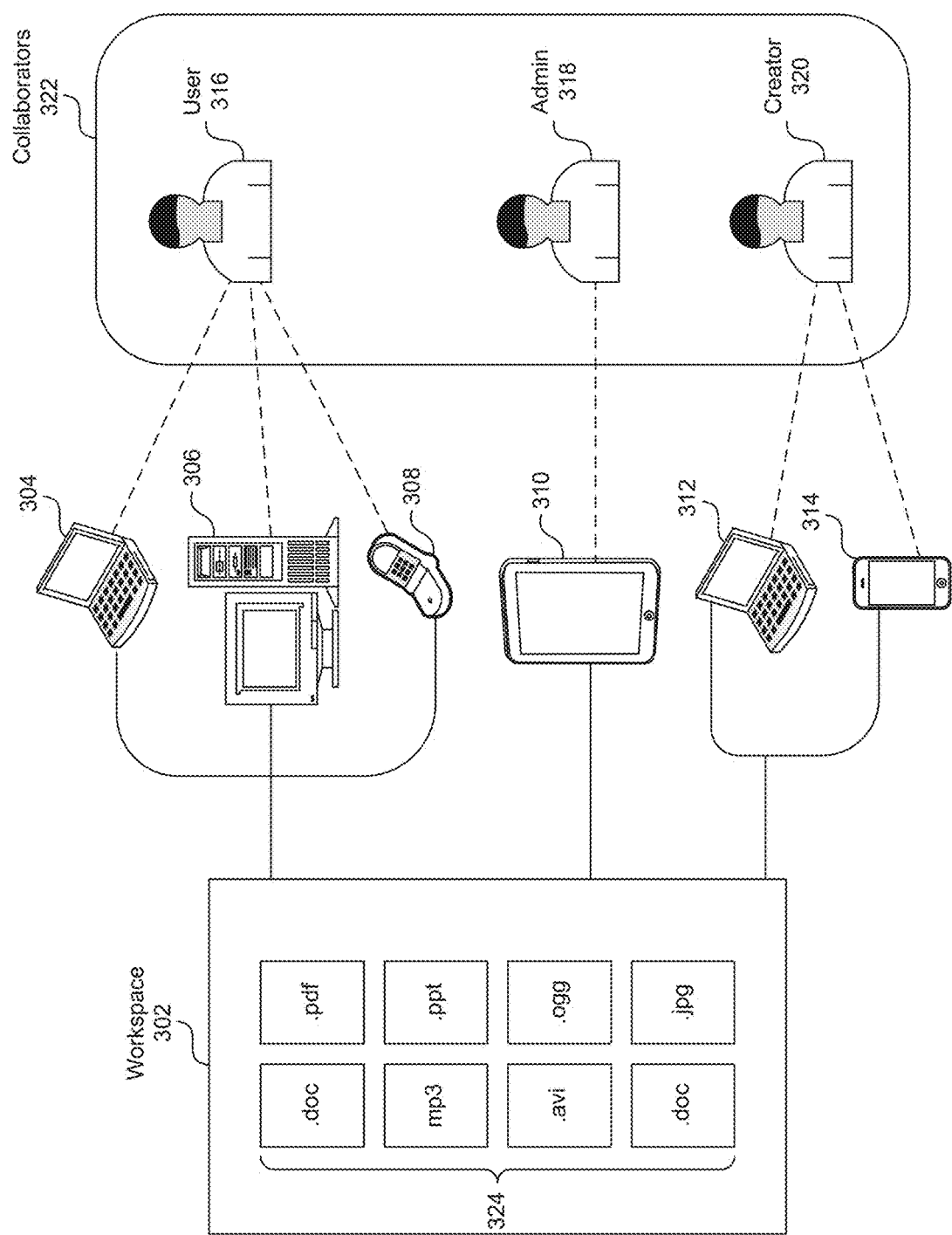
FIG. 3A depicts an example diagram of a workspace in an online or web-based collaboration environment accessible by multiple collaborators through various devices.

FIG. 3A depicts an example diagram of a workspace 302 in an online or web-based collaboration environment accessible by multiple collaborators 322 through various devices.

Each of users 316, 318, and 320 can individually use multiple different devices to access and/or manipulate work items 324 in the workspace 302 with which they are associated with. For example users 316, 318, 320 can be collaborators on a project to which work items 324 are relevant. Since the work items 324 are hosted by the collaboration environment (e.g., a cloud-based environment), each user can access the work items 324 anytime, and from any physical location using any device (e.g., including devices they own or any shared/public/loaner device).

Work items to be edited or viewed can be accessed from the workspace 302. Users can also be notified of access, edit, modification, and/or upload related-actions performed on work items 324 by other users or any other types of activities detected in the workspace 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification can be depicted preferentially (e.g., ordering in the user interface) based on user preferences and/or relevance to the user (e.g., implicit or explicit).

For example, a notification of a download, access, read, write, edit, or uploaded related activities can be presented in a feed stream among other notifications through a user interface on the user device according to relevancy to the user determined based on current or recent activity of the user in the web-based collaboration environment.

In one embodiment, the notification feed stream further enables users to create or generate actionable events (e.g., as task) which are or can be performed by other users 316 or collaborators 322 (e.g., including admin users or other users not in the same workspace), either in the same workspace 302 or in some other workspace. The actionable events such as tasks can also be assigned or delegated to other users via the same user interface.

For example, a given notification regarding a work item 324 can be associated with user interface features allowing a user 316 to assign a task related to the work item 324 (e.g., to another user 316, admin user 318, creator user 320 or another user). In one embodiment, a commenting user interface or a comment action associated with a notification can be used in conjunction with user interface features to enable task assignment, delegation, and/or management of the relevant work item or work items in the relevant workspaces, in the same user interface.

Figure 3B:
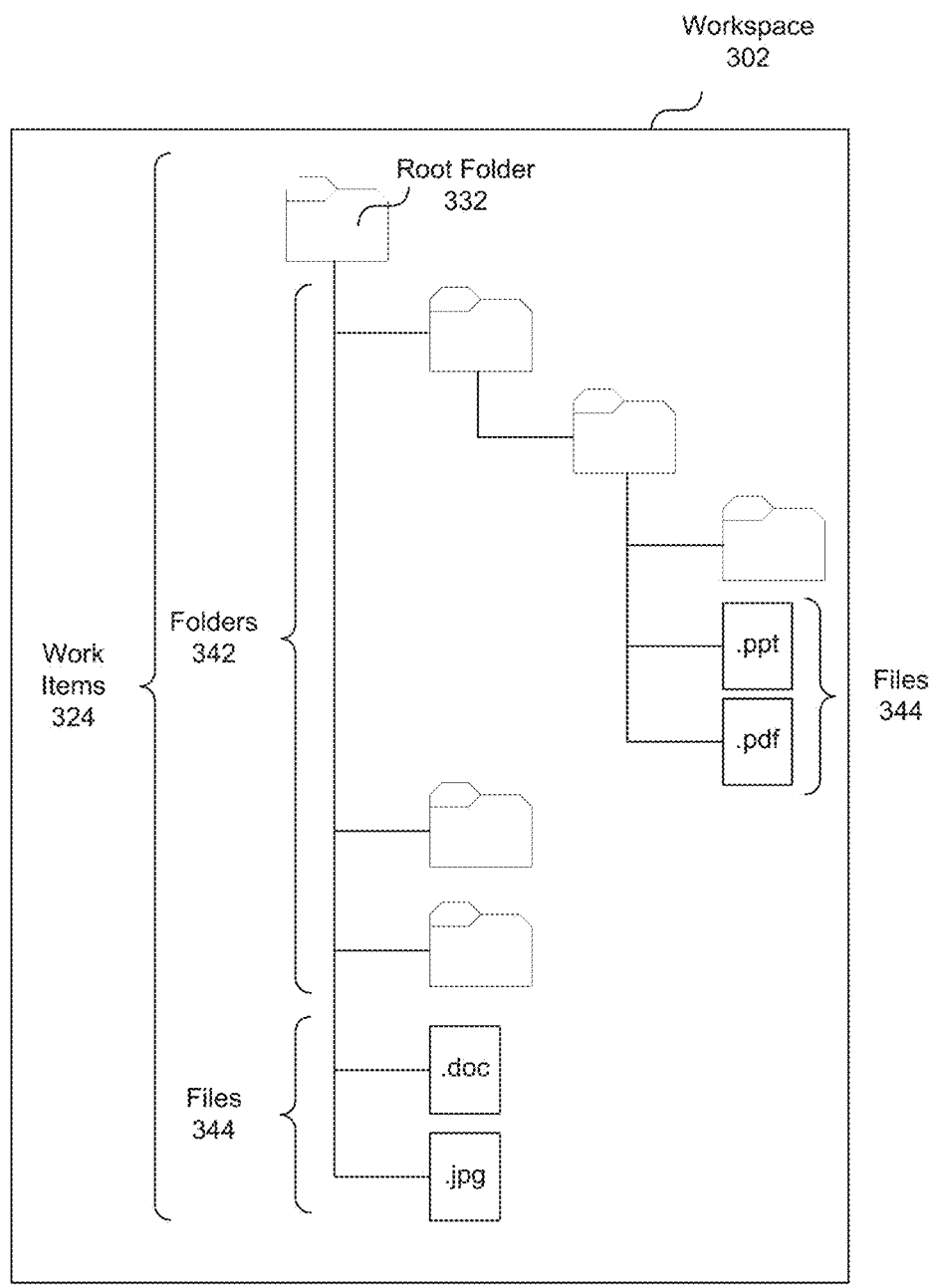
FIG. 3B depicts an abstract diagram illustrating an example data structure of the folders and files in the workspace of FIG. 3A.

FIG. 3B depicts an abstract diagram illustrating an example data structure of the folders and files in the workspace 302 of FIG. 3A. As illustrated in FIG. 3B, work items 324 of FIG. 3A can be further organized into groups using one or more folders 342 within workspace 302. The folders 342 can have more than one levels of hierarchy including, for example, parent/ascendant folder(s), child/decedent folder(s) or subfolder(s), and/or sibling folder(s). A person having ordinary skill in the art will understand that terminologies describing the hierarchy of the folders are used in a relative sense. For example, a parent folder can be a child folder of a grandparent folder, a particular child folder can be a parent folder of a grandchild folder, and so on. It is noted that the illustration of the folders are merely exemplary; depending on the embodiments, there can be more than one level of hierarchy between the illustrated folders.

Figure 3C:
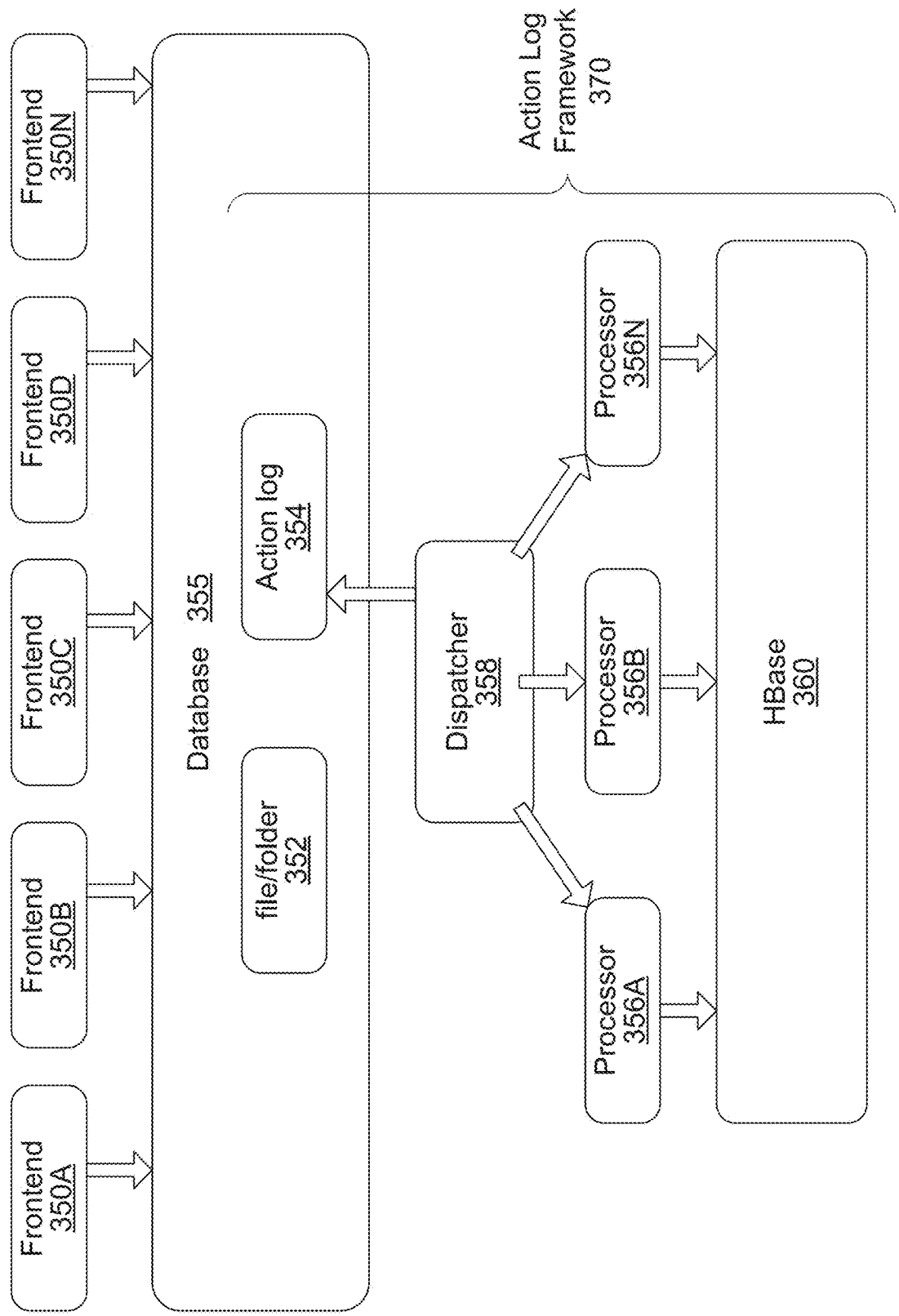
FIG. 3C depicts an example diagram illustrating the interaction between server-side components for incrementally updating a sync client with events or actions that occurred via a cloud-based environment.

FIG. 3C depicts an example system block diagram showing the interaction between server-side components for incrementally updating a sync client 110 with events or actions that occurred via a cloud-based platform.

The server-side includes front end components 350A-N, a database 355, a dispatcher 358, one or more processors 3560A-N, and a second database (e.g., HBase 360). The front end components 350A-N can interface with client devices to detect/identify actions or transactions or events. The data or file change that occur as a result of the event is effectuated in the database 355 of the cloud based environment (e.g., the relevant changes are made in the file table 352 of the database 355).

Depending on the type of action or event, an action log entry can be created and stored in the action log table or action log 354. In general, the front end 350 determines whether an action log entry is created from a given action or transaction. In general, an action log entry can be created for an action or event if certain durability requirements are to be met. The dispatcher 358 reads the action log entries from the action log 354 and sends them to the processors 356A-N where the fan-out, or collaborators to be notified of the event or to receive the file/data change as a result of the event is determined. Based on the computed fan-out or identified collaborators, the processors 356A-N writes the events/transactions to the relevant queues in the second database 360, from which the remote clients can read.

It is noted also that the action log 354, the dispatcher 358, the processors 356A-N, the HBase 360, and one or more real time clients 380A-N (see FIG. 3D) are generally referred to as an "action log framework (ALF) 370." More specifically, HBase 360 is a primary data repository of the ALF 370. User actions initiated (e.g., via the web application or the API) result in rows (or action log entries) being written to the action log 354 (or action log table 354). Then, in some embodiments, the action log entries are read from action log 354 by the ALF dispatcher 358, de-normalized into separate entries per user that needs to be notified of the action by an ALF processor (e.g., processor 356A), and written to the HBase 360. The HBase 360 is in turn read (e.g., via an API web service call) by real time clients 380A-N to notify a collaborator of the new change.

Figure 3D:
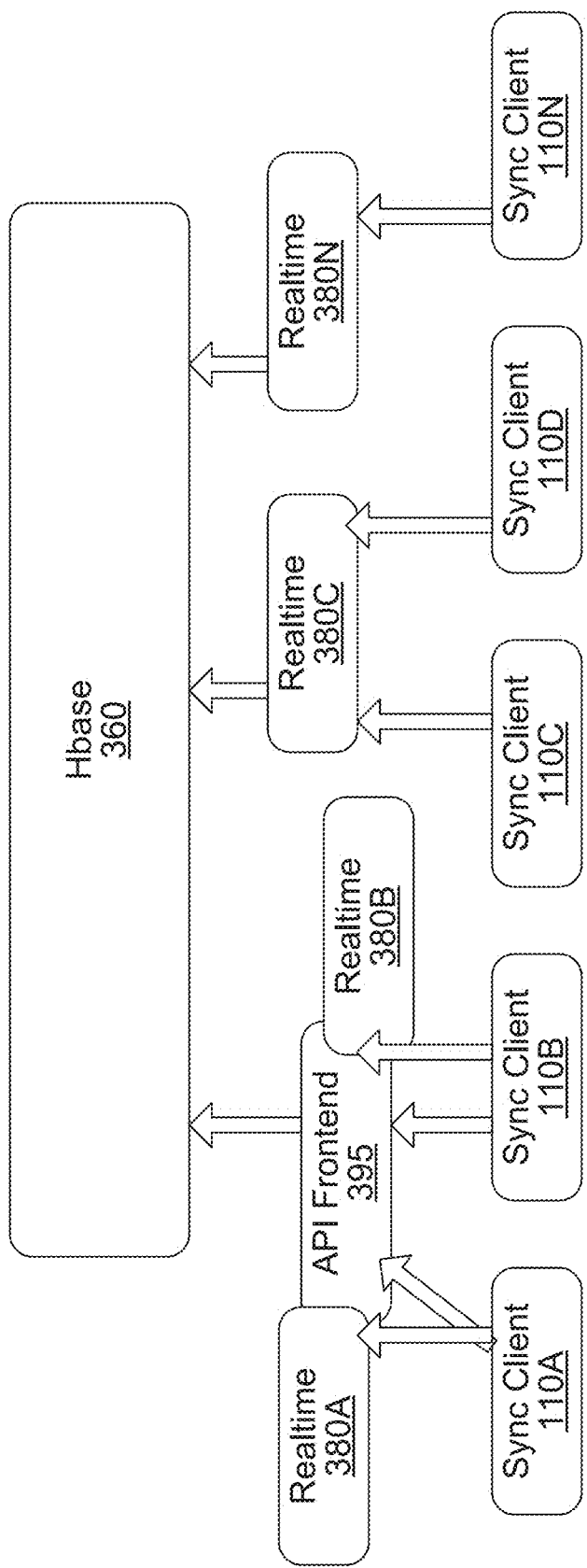
FIG. 3D depicts an example diagram illustrating the interaction of remote clients with a distributed database cluster for incremental updates of events/actions which occurred at a cloud-based environment.

FIG. 3D depicts an example block diagram showing the interaction of remote clients 380A-N and 370A-N with a distributed database cluster 360 for incremental updates of events/actions which occurred at a cloud-based environment. The remote clients can include, for example real time clients 380A-N (e.g., real-time web clients launched via a web browser, mobile application), and sync clients 110A-N (e.g., desktop synchronization, mobile synchronization, server synchronization, etc.) that users or collaborators use to interface/access the cloud-based environment including, but not limited to, a collaboration environment. Other types of clients may also read from the database cluster 360.

The queues in the database 360 (e.g., the distributed database cluster) are usually client type specific. For example, each queue is for a given client type for one given user. So, a user 'A' may have a synchronization client queue that all of the synchronization clients that user "A" uses reads from since user "A" may have multiple devices on which synchronization clients are installed. In general, the queues for clients in the database 360 are read only queues such that multiple clients can read from the same queue without making modifications. In this manner, if a user utilizes multiple synchronization clients, each client can still receive and detect the respective updates such that multiple devices can be synchronized. The remote clients also typically individually track the location in the queue from which they last read such that only the most recent events are updated at the client, and that the events read from a queue is specific to a given client, dependent on what has previously been synchronized or read.

In one embodiment, synchronization clients 110 connect to both real-time 380 and API front end 395 machines. The real time machines 380 can notify a synchronization client 110 when there has been an update in a user's account. The synchronization client 110 can then connect to API front end machine 395 to obtain the actual change/content. Alternatively, in some instances, the synchronization clients 110 can also obtain the changes/content/updates from the real time machines 380 simultaneous with the notification, or after being notified.

Figure 4:
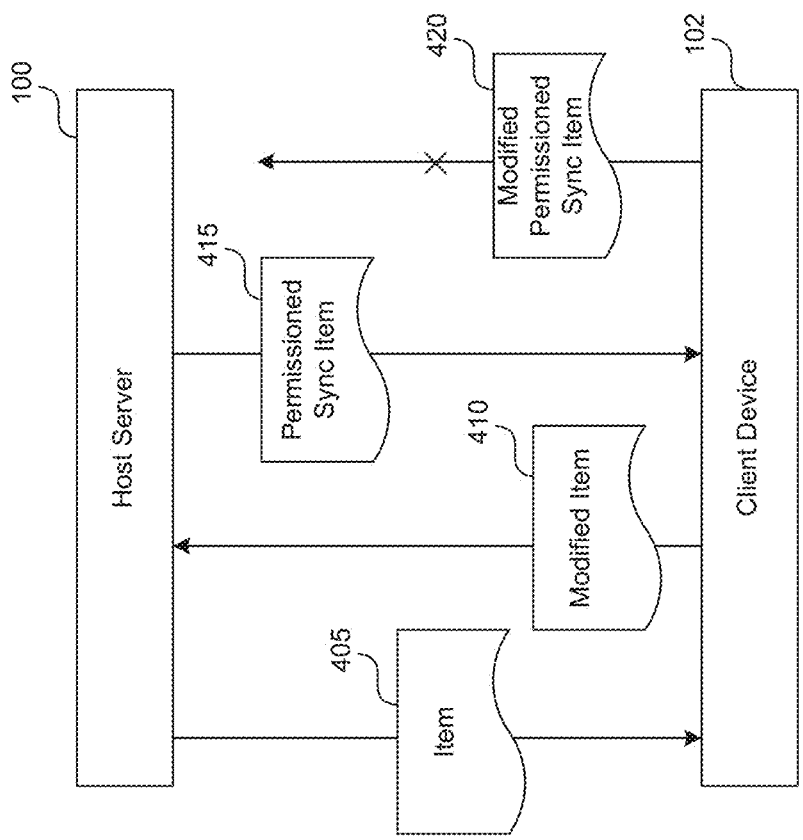
FIG. 4 depicts an example diagram illustrating preventing any changes made to a permissioned synchronization ("sync") item from being uploaded to the host server in the cloud-based environment.

FIG. 4 depicts an example diagram illustrating syncing of items in a workspace between a client device 102 and a host server 100 in the cloud-based environment. As illustrated, normally an item 405 in a workspace in the cloud-based environment that is marked for sync, can be downloaded from the host server 100 to the client device 102 via a sync client 110 on the client device 102. The syncing can occur whenever the item 405 is modified so that the client device 102 has the most up to date copy of the item 405. If a user of the client device 102 is an owner or an editor of the item 405, then the user has full read and write access to the item 405. The user can therefore modify the item 405 after it has been downloaded to the client device 102. The modified item 410 can be then be synced back to the host server 100 by the sync client 110 as a way to ensure the most up to date version of the item is available for access by other users having access to the workspace.

In accordance with the embodiments disclosed herein, the workspace in the cloud-based environment 110 can also include a permissioned sync item 415. As used herein, a permissioned sync item is an item (e.g., a file or a folder) that is marked for sync and has one or more permission attributes associated with it. In some embodiments, an enterprise admin or an item owner can assign the sync and permission attribute to an item. The permissioned sync item 415 can thus be synced to the client device 102 via the sync client 110. In some embodiments, the permissioned sync item 415 can be clearly identified as such using an iconography so that the user of the client device 102 can recognize it as a sync item having a permission attribute. In some embodiments, based on the permission attribute associated with it, file system attributes of the permissioned sync item 415 can be modified so that an application used to open the permissioned sync item can disable certain features of the application to comply with the permission attribute. For example, if the permissioned sync item 415 has a permission attribute for edit set to false (i.e., edit not allowed), the sync client 110 can change the file system attribute of the item to "read-only." This would, in turn, cause an application to open the permissioned sync item 415 as a read-only item and disable editing features of the application.

In accordance with the present disclosure, a sync item can have one or more permission attributes associated with it.

The permission attributes can be assigned to the sync item by an enterprise admin in some embodiments and can be applicable to all users or a select group of users (e.g., employees in the marketing department) managed by the enterprise admin. In other embodiments, the permission attributes can be assigned to a sync item by a co-owner who has owner permissions. Table 1 below provides some examples of permission attributes that an enterprise admin and/or item co-owners can assign to sync items.

TABLE 1

Permissions on Sync Items

| Permission Attributes on Sync Items | Explanation |
|---|---|
| Preview only | Can preview sync items using an integrated content viewer. |
| Read only | Can preview and view sync items |
| Read-write | Can read sync items and can edit, can upload, can delete, can rename, can move, can create |
| Create | Can create a new item in the sync item |
| Delete | Can delete a sync item |
| Move | Can move a sync item to another location or can move a local item into the sync item |
| Rename | Can rename a sync item |
| Edit | Can edit a sync item |
| Tags | Can add tags to a sync item |
| Assigning tasks | Can assign tasks to others on a sync item |
| Creating links | Can create links for sharing sync items |
| Creating bookmarks | Can create a bookmark on a sync item |
| Device pinning | Set a number of sync client a user can install |
| Multiple devices | Control a number of devices that a user can have for accessing a sync item (and/or an account in general) can be accessed |
| External collaboration | Can restrict collaboration with users external to the enterprise |
| Number of accounts | Control a number of accounts that can access a sync item |
| Mobile device | Can restrict a user from accessing a sync item from a mobile device. |
| Third-party application | Control a user's access to third-party applications for accessing or modifying a sync item. |

It should be noted that a user can perform or attempt to perform some of the actions listed in table 1 via the web application or a mobile application, while other actions can involve interaction with a local sync folder in the client device. For example, if permitted, a user can assign a task on a sync item to another user or collaborator using the web application or the mobile application. Similarly, the user can edit a local item in a sync folder on the client device and if permitted, the edited item can be synced back to the host server.

Referring to FIG. 4, it can be possible for the user to edit the permissioned sync item 415 to obtain a modified permissioned sync item 420. For example, if the permissioned sync item 415 is a folder, a new file can be created or moved inside the folder which would modify the sync item 415. Similarly, a file in the folder can be deleted, a file or the folder can be renamed, a file can be edited, and so on. In some embodiments, when the sync client 110 attempts to upload the modified permissioned sync item 420 to the host server 100, the host server 100 can provide an error response rejecting the modified permissioned sync item 420 (e.g., fail the sync event). The sync client 110 on the client device 102 can then handle the error response so that the permissioned sync item 415 is stored locally on the client device 102. The method of handling the error response can depend on the type of action taken on the permissioned sync item 415. FIGS. 6-10 describe various methods of handling the error response for example actions taken on the permissioned sync item 415.

Figure 5A:
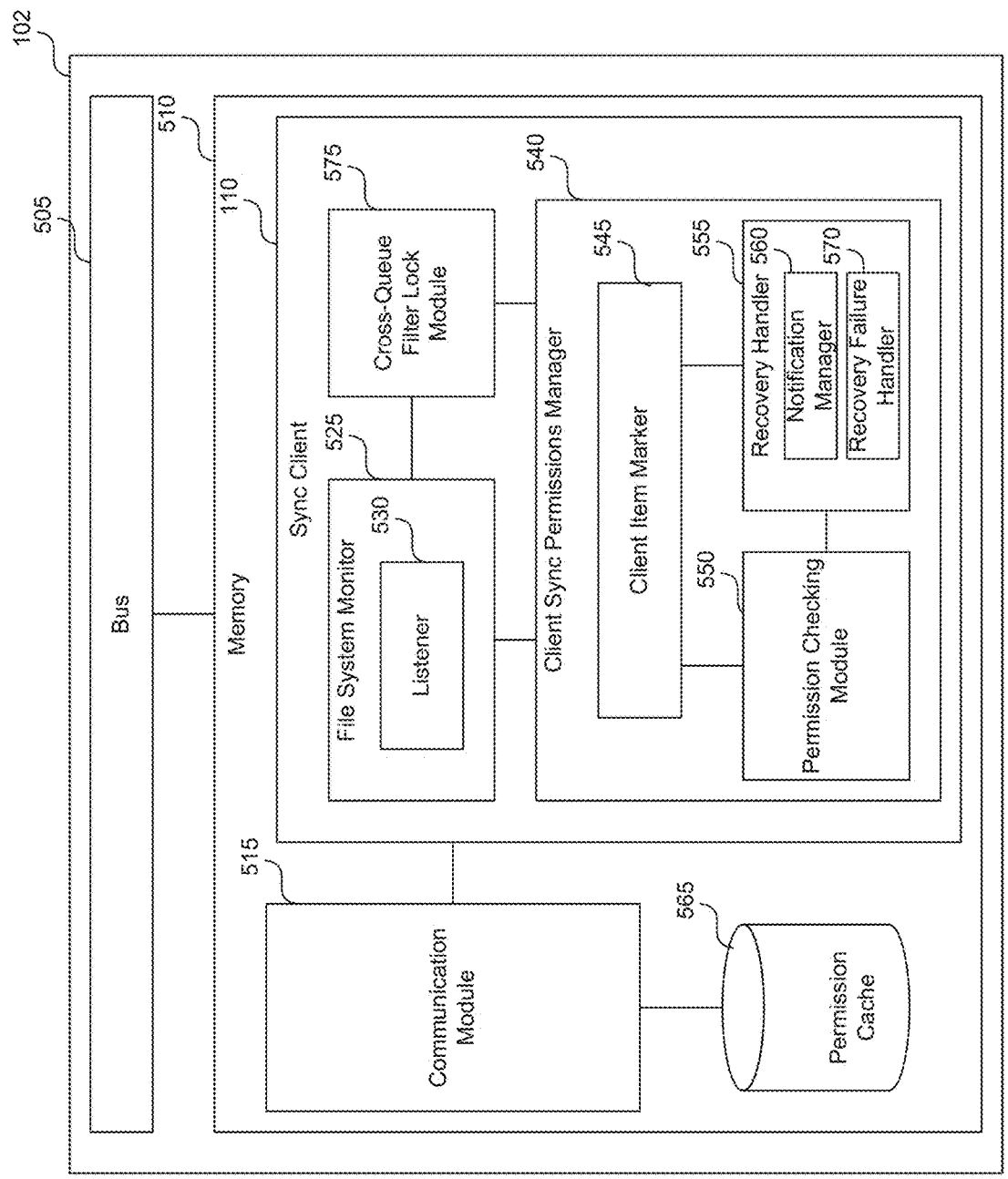
FIG. 5A depicts an example diagram illustrating components of a synchronization client of the cloud-based environment that is capable of preventing changes made to a permissioned sync item from being uploaded to the host server in the cloud-based environment and for handling those changes locally.

FIG. 5A depicts an example diagram illustrating components of a client device 102 having a sync client 110 of the cloud-based environment that is capable of preventing changes made to a permissioned sync item from being uploaded to the host server in the cloud-based environment and for handling those changes made locally.

In some embodiments, the client device 102 can include a bus 505 and a memory 510 among other components. The memory 510 can include a communication module 515, a permission cache 565 and a sync client 110. The communication module 515 can facilitate communication between the client device 102 and the host server 100 using any of the communication protocols supported by the client device 102 and the host server 100. The memory 510 may also include other device modules such as a GPS module for determining and providing location information, text input module for accepting and processing inputs provided using different input mechanisms of the mobile device, and the like for handling various functions of the client device 102. Additional or less components/modules/engines can be included in the client device 102 and each illustrated component.

The bus 505 is a subsystem for transferring data between the components of the client device 102. For example, the bus 505 can facilitate the transfer of data between the memory 510 and other components of the client device 102 such as the processor and/or the input/output components that utilize the data.

As used herein, a "module," "a client," "a monitor," a "handler," a "listener," a "marker," or a "manager" can include a general purpose, dedicated or shared processor and, typically, firmware or software modules that are executed by the processor. Depending upon implementation-specific or other considerations, the module, client, monitor, handler, listener, marker or manager can be centralized or its functionality distributed. The module, client, monitor, handler, listener, marker or manager can include general or special purpose hardware, firmware, or software embodied in a computer-readable (storage) medium for execution by the processor. As used herein, a computer-readable medium or computer-readable storage medium is intended to include all media that are statutory (e.g., in the United States, under 35 U.S.C. § 101), and to specifically exclude all media that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In some embodiments, the sync client 110 can include a file system monitor 525 having a listener 530 and a client sync permissions manager 540 having a local item marker 545, a permission checking module 550 and a recovery handler 555 having a notification manager 560 and a recovery failure handler 570. The permission attributes and/or any other item attributes can be cached locally in the permission cache 565.

In some embodiments, the file system monitor 525, via the listener 530, can receive new events reported from the host server 100 (e.g., via the ALF system described in FIGS. 3C and 3D). In some embodiments, the client sync permissions manager 540 can manage permissions associated with synced items. The client sync permissions manager 540 can also perform permission checks with the host server 100

(e.g., via APIs) to determine whether a change to a permissioned sync item is permitted or denied. If permitted, the changed item can be uploaded to the host server 100. However, if denied, the client sync permissions manager 540 can handle the error response from the host server 100 to restore the item to its original state. In some embodiments, the client sync permissions manager 540 can also handle any failures in restoring the item to its original state.

In some embodiments, the local file system marker 545 can mark an item on a client device based on a permission attribute to indicate that the item has the permission attribute. In some embodiments, the local file system marker 545 can also mark an item on the client device based on a sync attribute to indicate that the item is a sync item. In further embodiments, the local file system marker 545 can receive or detect a change to the permission attribute of the sync item (e.g., via events received by the file system monitor 525) and in response, dynamically update the marking on the sync item on the client device based on the change to the permission attribute.

Generally, the local file system (i.e., the file system on the client device 102) does not reflect the permission attributes of a sync item on the host server. For example, if a file is read-only on the host server, does not mean that the file would be read-only on the local file system as well. The local item marker 545 can use the permission attribute to change one or more local file system attributes so that the file has the same permission attribute locally as well as remotely. In other words, local item marker 545 ensures that the local file reflects the state of the file in the host server 100. As a result of the change in the local file system attribute, when the user opens the file in an application, the application can indicate to the user that the file has a certain permission attached to it and can disable the restricted features. For example, if the file is "read-only," then the application can indicate to the user that the file is read-only and can disable editing features of the application so that the file cannot be edited.

The local item marker 545, in some embodiments, can receive the permission attributes in response to a call to get the folders/files in the user's account. The call can return a folder listing and/or files in each folder along with attributes of the folders and/or files (e.g., permission attributes). In some embodiments, changes in the permission attributes can be reported by the ALF system to allow the changes in permissions on the host server 100 to be synced to the local file system. The local file system marker 545 can clear and/or set local file system attributes based on the permission changes on the host server 110. The setting of the local file system attributes, in some embodiments, can be efficient and fast because the local file system marker 545 can mark all the files in the sync folder using the appropriate local file system attribute or setting and does not need to track the "waterfall" permissions (e.g., a permission model where a user has access to a folder that he or she is invited into and any subfolders beneath it). In some the local file system marker 545 can receive permissions changes at the sub-folder level and/or file level from the ALF. Alternatively, if permission changes only for the top level of the sync folder is received, spidering may be done to determine the permission changes for sub-folders beneath the sync folder and that can be replicated in the permission cache 565.

In some embodiments, the local item marker 545 can cache the permission attributes in the permission cache 565 by an identifier. If asked about a folder that is not in the cache a query can be made for the permissions on the host server and the result can be added to the permission cache 565. When a file has finished downloading, the local item marker 545 can check the permission attributes of the owning folder or the file (via the permission cache 565) and the set the local file system attribute appropriately before moving the file into the sync folder.

The user can of course force their way through by clearing the bit. They can also create new content or move files, so marking the sync folder and/or content therein as permissioned may not be enough protection against unpermitted action. The permission checking module 550 and the recovery handler 555 can detect and reverse the unpermitted changes to the sync item.

In some embodiments, the permission checking module 550 can detect any changes to a sync item and can check with the host server 100 whether those changes to the sync item are permitted. By checking against the host server 100, the permission checking module 550 ensures that the check is based on the most up to date information. In some embodiments, the permission check can be performed using permission information cached in the permission cache 565. If the information is not available in the permission cache 565, a query can be made to the host server 100 and the response can be added to the permission cache 565. The permission cache 565, in some embodiments, can be updated when the permission changes occur at the host server 100 and those permission changes are received via the ALF or by querying the account tree. The permission checking module 550 can obtain a success message or a permission denied error message. The success message is received when the changes to the sync item are permitted based on the permission attributes associated with the sync item. Alternatively, the permission denied error can be received when the changes to the sync item are not permitted.

In some embodiments, the recovery handler 555 can handle locally the changes to the sync items that have been rejected by the host server 100 to restore the sync item to its previous state. For example, if an edit to a sync item has been rejected by the host server 100, the recovery handler 555 can create a conflict copy of the edited item and download an original copy of the sync item from the host server 100. Example cases and how the recovery handler handles those cases are described in detail with respect to FIG. 6.

In some embodiments, the steps taken by the recovery handler 555 could fail. For example, for the edit case above the creation of the conflict copy could fail due to disk space. Similarly, download of the original sync item could fail due to communication failure or the item having been deleted from the host server 100. Each of these "sub-failures" in the recovery handler 555 can be dealt with by the recovery failure handler 570. Table 2 below lists some example errors encountered and resolution action taken by the recovery failure handler 570 when recovering from example events related to editing, deleting, moving and creating.

TABLE 2

Recovery Failures

| Recovery Failure Errors | Edit | Delete | Move | Create |
|---|---|---|---|---|
| PERMISSION_ERROR | Problem item: Edited item cannot be moved and the original item could not be downloaded even if the edited item could be moved. | Problem item: Original item could not be downloaded from the host server. | Problem item: Sync item could not be moved back. Retry until the move fails. | Problem item: Can only encounter this in the permission-error-masking-name-in-use case. New item could not be downloaded. |
| Item doesn't exist on host server: ITEM_DELETED OPPOSITE_ITEM_DELETED | No operation ("No-op") | No-op | No-op | No-op |
| ITEM_NAME_IN_USE | Not possible. | Move the blocking item aside on local fs and retry. | Move the blocking item aside on local fs and retry. | Make a conflict rename to move the item out of the way. |
| VERSION_MISMATCH | Something modified the file after an edit. Retry and wait for the other edit to collapse. | Not possible. Download will bring down latest (or most recent) version. | The user moved the file during resolution. Retry and wait for the user's new move to collapse. | Not possible.. |
| PARENT_ITEM_DELETED RATE_LIMIT | Not possible. Retry after wait, wait max(default wait, rate limit wait) | Not possible. Retry after wait, wait max(default wait, rate limit wait) | Not possible. Retry after wait, wait max(default wait, rate limit wait) | Not possible. Retry after wait, wait max(default wait, rate limit wait) |
| Expected general errors: AUTHENTICATION_ERROR, COMMUNICATION_ERROR, TRANSIENT_ERROR, BAD_REQUEST_ERROR, ITEM_NOT_FOUND, OPPOSITE_ITEM_NOT_FOUND, UNEXPECTED_ERROR, | Else case: Retry after wait | Else case: Retry after wait | Else case: Retry after wait | Else case: Retry after wait |
| Unexpected general errors | Else case: Retry after wait | Else case: Retry after wait | Else case: Retry after wait | Else case: Retry after wait |

In some embodiments, the notification manager 560 can generate a notification (e.g., a growl notification) when an action on a sync item is rejected or denied or when the action is altered or reverted because the action is not permitted on the sync item. Example titles and messages for actions or operations that may not be permitted on a sync item in some embodiments are listed in Table 3 below.

TABLE 3

Notification Messages

| Actions | Message Title | Message |
|---|---|---|
| Create | Create not allowed | The <item name> could not be created on the host server. Move the <item name> to a folder where you have upload permission. |
| Delete | Delete not allowed | The <item name> could not be deleted on the host server. It has been restored. |
| Edit | Edit not allowed | The <item name> could not be edited on the host server. It has been restored. A copy of the changed file was saved to <item name -copy>. |
| Move | Move not allowed | The <item name> could not be moved on the host server. It has been restored. |
| Rename | Rename not allowed | The <item name> could not be renamed on the host server. It has been restored. |

In some embodiments, the cross-queue filter lock module 575 can provide a locking mechanism to prevent local and host server events on the same item from executing at the same time. One reason is that the recovery for a local event can involve host server calls (e.g., download of a sync item) and these could proceed at the same time as a host server event in the remote file system queue. When an item is mapped in the LSIS, the sync event queue can use a lock on the sync item to prevent the opposite queue from processing events for the same sync item at the same time. The cross-queue locking does not affect concurrency in any significant way and can reduce timing problems with the sync event execution.

Figure 5B:
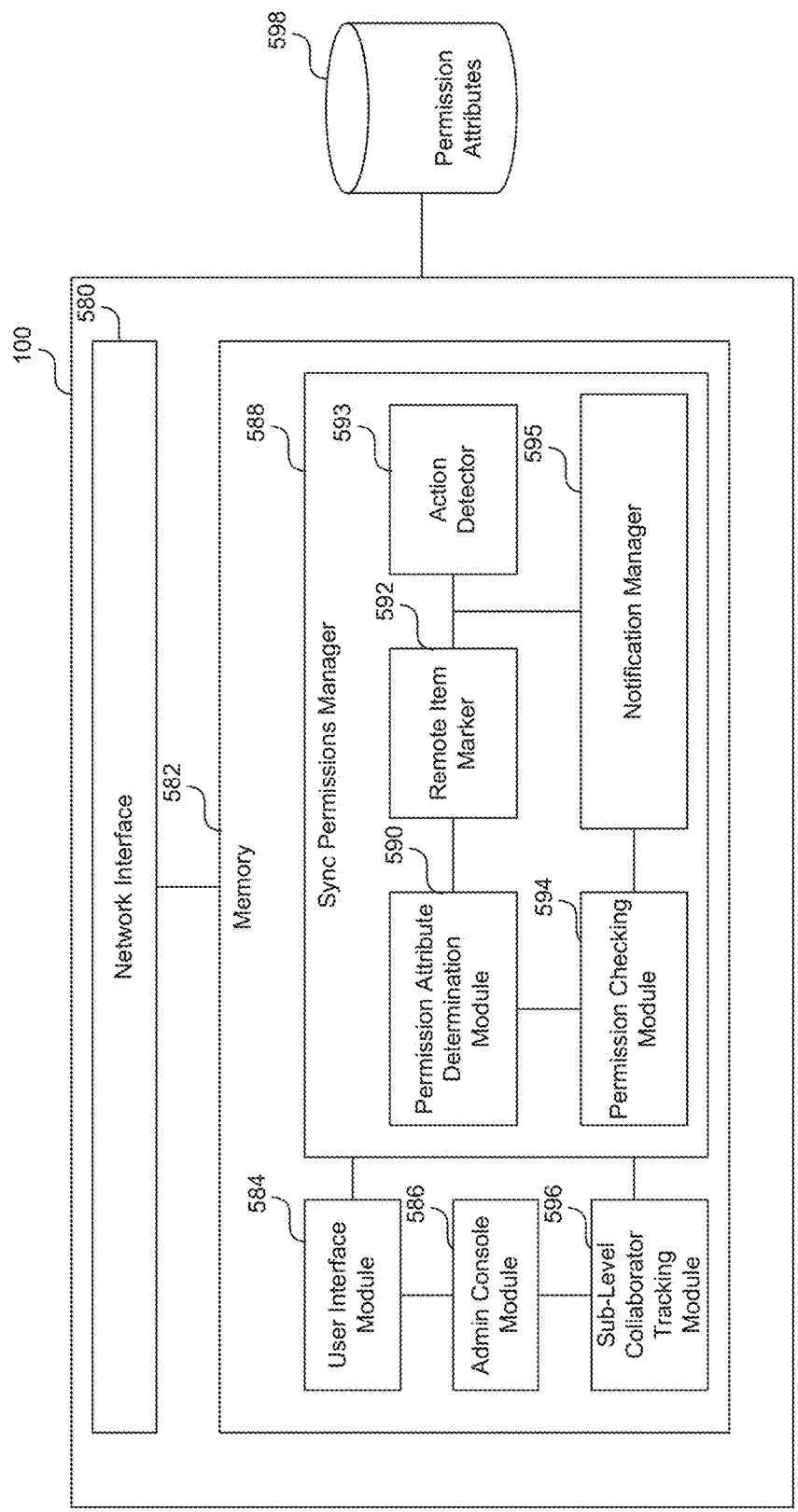
FIG. 5B depicts an example diagram illustrating components of the host server of the cloud-based environment that is capable of performing permission checks to prevent any changes to a permissioned sync item that are not permitted based on permission attributes of the sync item in the cloud-based environment.

FIG. 5B depicts an example diagram illustrating components of the host server 100 of the cloud-based environment that is capable of performing permission checks to prevent any changes to a sync item that are not permitted based on permission attributes of the sync item in the cloud-based environment.

As illustrated, in some embodiments, the host server 100 can include a network interface 580, a memory 582 storing a user interface module 584, an admin console module 586, a sync permissions manager 588, a permission attribute determination module 590, a permission checking module 594, a remote item marker 592 and a sub-level permission tracking module 596.

As used herein, a "module," a "manager," or a "marker" includes a general purpose, dedicated or shared processor and, typically, firmware or software modules that are executed by the processor. Depending upon implementation-specific or other considerations, the module, manager, interface, or engine can be centralized or its functionality distributed. The module, manager, or marker can include general or special purpose hardware, firmware, or software embodied in a computer-readable (storage) medium for execution by the processor. As used herein, a computer-readable medium or computer-readable storage medium is intended to include all media that are statutory (e.g., in the United States, under 35 U.S.C. § 101), and to specifically exclude all media that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The network interface 580 can be a networking module that enables the host server 100 to mediate data in a network with an entity that is external to the host server 100, through any known and/or convenient communications protocol supported by the host and the external entity. The network interface 580 can include one or more of a network adaptor card, a wireless network interface card (e.g., SMS interface, Wi-Fi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater.

In accordance with some embodiments, the host server 100 can receive an instruction to perform an action on a sync item stored in a workspace hosted by the host server 100. In some embodiments, the instruction can be sent from a web application user interface (e.g., user interface 104 in FIG. 1) and received by the user interface module 584. In some additional or alternative embodiments, the instruction can be sent from a client software user interface (e.g., user interface 107 of FIG. 1) and received by the network interface 580. The sync item can be a folder or a file that is enabled for sync. Although various aspects of the host server 100 are described herein in the context of sync items having permissions, these aspects can be applicable for items having permissions that are not enabled for sync.

The admin console module 586 can provide a user interface for enterprise admins to obtain an overview of user accounts, manage user accounts (e.g., add or delete user accounts, configure permissions for users, set a security attribute on items, set permission attributes on items (e.g., sync items) and/or the like. For example, an enterprise admin can, via the admin console, provided by the admin console module 586 set "can sync" as a security attribute on an item to allow users to sync the item to their client devices. Similarly, the enterprise admin can, via the admin console, set permission attributes to a sync item (and/or an item not marked for sync). The permission attributes can be a part of folder settings in some embodiments. The permission attributes can be stored in a permission attributes database table 598.

In some embodiments, the sync permissions manager 588 can allow or deny requests to take an action on a sync item based on one or more permissions associated with the sync item. The action detector 593 can detect, based on an instruction received by the user interface module 584 or through the network interface 580, an attempt by a user to take an action on a sync item at the host server 100. The action can be any action such as those listed in table 1, or any action on a sync item that is supported by the host server 100. In some embodiments, the permission attribute determination module 590 can retrieve permission attributes associated with the sync item from the permission attributes database table 598. In some embodiments, permission attribute determination module 590 or another module can also determine an access level of the user. For example, the user can be a co-owner/editor (e.g., a user who can upload, download, preview, get link, edit, delete. invite new collaborators, change access levels of existing collaborators), viewer-uploader (e.g., can upload, download, preview, get link, add comments), previewer-uploader (e.g., can upload, preview, add tags, comment), viewer (e.g., download, preview, get link), previewer (e.g., can preview) or uploader (e.g., can upload).

In some embodiments, the permission checking module 594 can perform a permission check to determine whether the action on the sync item by the user is permitted based on the one or more permission attributes associated with the sync item. In some embodiments, the access level of the user can also be considered in performing the permission check. For example, if the user is a viewer-uploader, the user can have full read access to the sync item and limited write access (e.g., can add tags, invite new collaborators or delete). If the sync item has a permission attribute that allows adding or editing a tag but does not allow inviting new collaborators, deleting or uploading the sync item, then the viewer-uploader can only add or edit a tag on the sync item. If the action that the viewer-uploader is attempting to perform is "inviting new collaborators," then permission checking module 594 can determine, based on the permission attribute associated with the sync item that "inviting new collaborators" is not permitted. The permission checking module 594 can then generate a permission denied error. The notification manager 595 can generate a notification message for display on the user interface of the client device of the user. If the action is allowed based on the permission attribute associated with the sync item and/or user access level, then the permission checking module 594 can allow the user to perform the action on the sync item.

In some embodiments, the remote item marker 592 can mark a sync item (e.g., a folder) based on the permission attributes associated with it. For example, if a sync folder's permission attribute "can invite external collaborators" is set to false, then the sync folder can be marked as a safe folder using iconography that provides a clear visual indication that the sync folder is only for internal collaborators (i.e., collaborators within an enterprise).

In some embodiments, the sub-level collaborator tracking module 596 can track and identify collaborators at various sub-levels of a sync item for display on a user interface provided by the user interface module 584 or a client software application. For example, if a folder A includes a sub-folder A-1 and a sub-folder A-2 and users 1-5 are collaborators in sub-folder A-1 and users 4-8 are collaborators in sub-folder A-2, then the collaborators at each sub-folder level can be clearly identified to indicate that a specific user's access begins at a specific sub-folder level.

Figure 6:
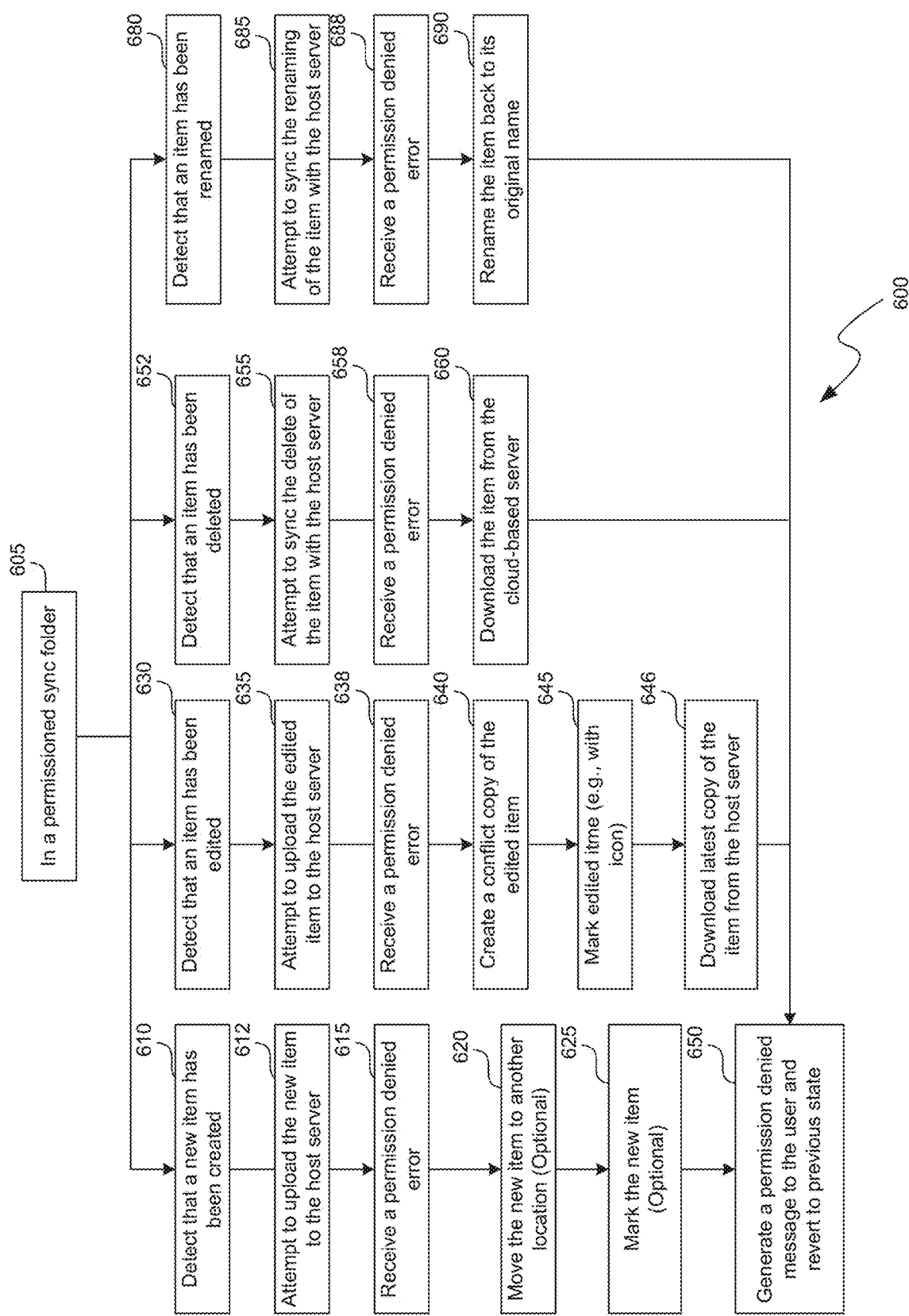
FIG. 6 depicts an example diagram illustrating a method of detecting and handling different types of unauthorized changes made to a permissioned sync item on a client device.

FIG. 6 depicts an example diagram illustrating a method 600 of detecting and handling different types of actions on or changes made to a permissioned sync item on a client device.

In some embodiments, the sync client 110 can detect that a new item has been created inside a permissioned sync folder at block 610. The sync client 110 can then attempt to sync the new item to the host server 100 at block 612. At block 615, the sync can fail with a permission denied error. The new item then becomes a problem item. The sync client 110 can then (optionally) move the new item (or problem item) to another location at block 620. The sync client 110 can also (optionally) mark the new item at block 625. For example, the new item can be marked with an icon, a color, etc. Any indicator can be used to mark the new item. Lastly, the sync client 110 can generate a permission denied message to the user and take an action to revert to the previous state of the permissioned sync folder at block 650.

In some embodiments, the sync client 110 can detect that an item in the permissioned sync folder has been edited at block 630. The sync client 110 can then attempt to upload the edited item to the host server at block 635. At block 638, the sync client 110 can receive a permission denied error. The sync client 110 can then make a conflict copy of the edited item at block 640 and can mark the edited item (e.g., with an icon) at block 645. At block 646, the original item that was edited from the host server can be downloaded. The sync client 110 can also generate a permission denied message to the user and take an action to revert to the previous state of the permissioned sync folder at block 650. In some embodiments, the message can indicate where the conflict copy of the edited item is located. In some embodiments, the sync client 110 can attempt to upload the new item and/or the edited item by using a preflight upload API that does not actually involve an upload. By using the preflight API, network bandwidth can be saved by not sending uploads that can be rejected by the host server.

In some embodiments, the sync client 110 can detect that an item in the permissioned sync folder has been deleted at block 652. The sync client 110 can then attempt to sync the delete event with the host server (e.g., using a delete API) at block 655. The sync client 110 can receive a permission denied error at block 658. At block 660, the sync client 110 can download the item that was deleted locally from the host server at block 660 and ignore the local delete. The sync client 110 can generate a permission denied message and take an action revert to the previous state of the permissioned sync folder at block 650. For example, if the permissioned sync folder is itself deleted locally, the sync client 110 can recreate the deleted sync folder by downloading the sync folder from the host server 100. However, in some embodiments, deleting the sync folder can result in unsyncing of the folder. This functionality can be configurable at the host server 100 by an administrator.

In some embodiments, the sync client 110 can detect that an item in the permissioned sync folder has been renamed at block 680. The sync client 110 can attempt to sync the rename event with the host server 100 (e.g., via the rename API) at block 685. At block 688, the sync client 110 can receive a permission denied error. The sync client 110 can then rename the item back to its original name (e.g., via a sync API) at block 690 such that the local item has the same name as the item in the host server 100. The sync client 110 can also generate a permission denied message and take an action to revert to the previous state of the permissioned sync folder at block 650.

In some embodiments, the sync client 110 can detect that an item has been moved in or out of the permissioned sync folder at block 665. For the item that has been moved in, the sync client 110 can treat it as a create event. For the item that has been moved out, the sync client 110 can treat it as a delete event. The sync client 110 can move the item back out or in and ignore the local move.

In some embodiments, the sync client 110 can generate a notification (e.g., growl notifications) when an action on a sync item is rejected or denied or when the action is altered or reverted because the action is not permitted on the sync item.

In some embodiments, the steps taken by a recovery handler of the sync client 110 to recover from the permission error can fail. For example, for the edit case described with respect to FIG. 6, the creation of the conflict copy could fail due to disk space or permissions. Similarly, a download of an item can fail due to communication failure or the item having been deleted from the host server 100. The sync client 110 can deal with each of these "sub-failures" in the failure recovery handler. FIGS. 7-10 illustrate example methods of handling example create, move/rename, delete and edit recovery failures.

Figure 7:
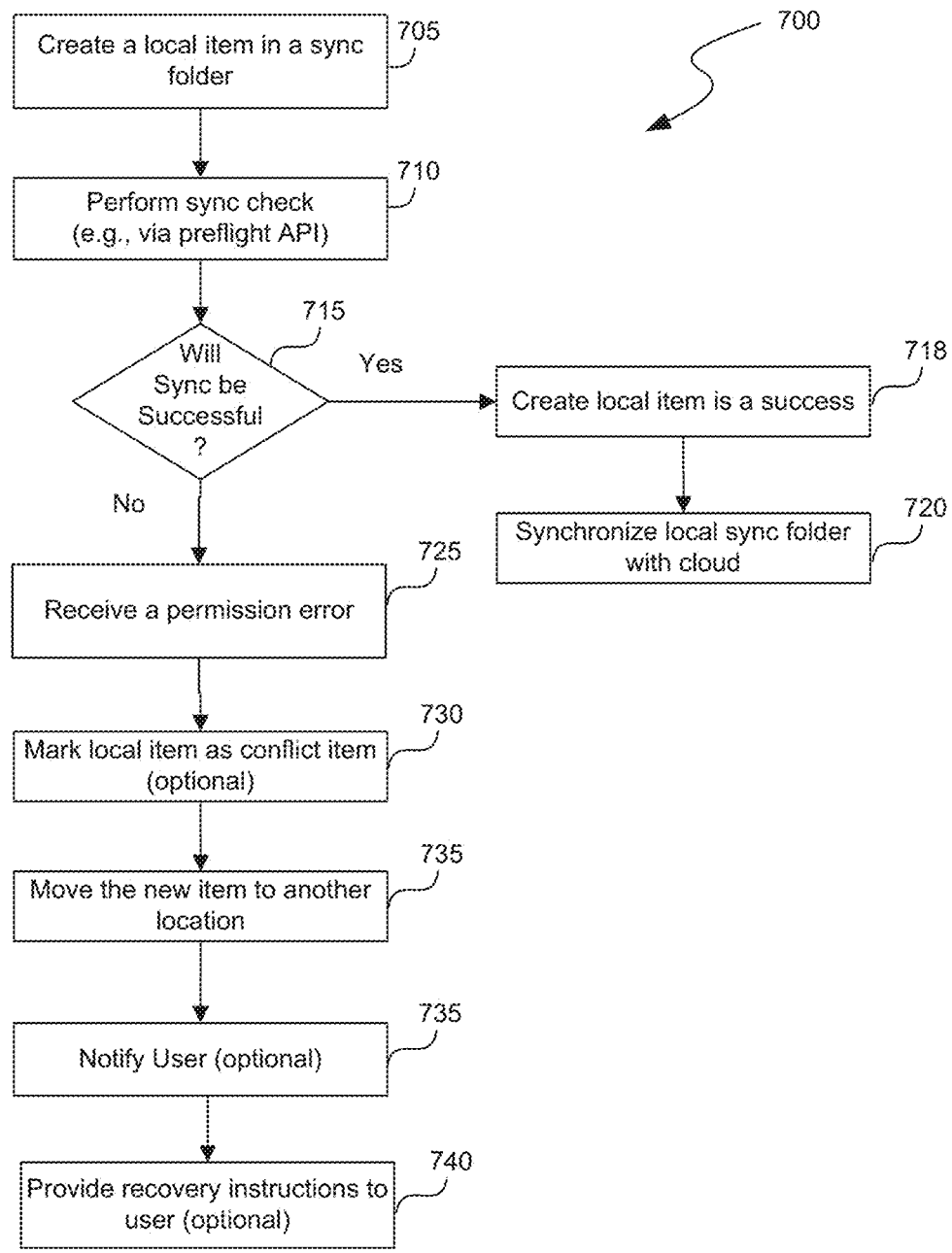
FIG. 7 depicts an example diagram illustrating a method of handling a "create" failure by a sync client on a client device.

FIG. 7 depicts an example diagram illustrating a method of handling a "create" failure by a sync client 110 on a client device. In some instances, the host server can return a "permission denied" message when a certain action (e.g., create action) is not allowed in a sync folder or due to another reason. The permission denied message can thus mask the actual reason for a failure to sync a create event. In some instances, the create event can fail to sync when a user creates a file with a file name locally and another file with the same filename is created or exists on the host server. This "name-in-use" condition will need to be handled before file from the host server 100 can be downloaded to the client device. The sync client, in some embodiments, can determine if the permission denied error was received due to permissions or another reason and recover from the error accordingly.

The example method 700 starts with a user creating a local item in a sync folder at a client device at block 705. The sync client 110 can then perform a sync check on the local item with a host server at block 710. In some embodiments, the sync check can be performed by the preflight API. At a decision block 715, the sync client 110 determines if the sync is going to be successful. If the sync is going to be successful, the sync client 110 can create locale item is a success at block 718 and synchronize the local sync folder with the cloud at block 720. If the sync is not going to be successful, the sync client 110 can receive a permissioned denied error at block 725. Optionally, the sync client 110 can check if the local item name is in use at the host server. The sync client 110 can use a host server monitor (or API) as a quick and inexpensive way to see if the name is in use on the host server without a direct query of the host server. In some embodiments, the monitor might not have the host server item right away but it can eventually get that information from ALF events in between retries. If the name is in use, the sync client 110 can rename the local item to a conflict name and then retry syncing after a time interval. This allows a create event from the host server to succeed.

At block 730 the sync client 110 can optionally mark the local item as a conflict item and, at block 735, move the local item to another location. The sync client 110 can then notify the user (e.g., collaborator operating the client device on which the sync client 110 is running) via the client device (e.g., via a permission denied message) about the unsuccessful sync and the state and location of the locally created item. Lastly, the sync client 110 can optionally provide the user with additional recovery instructions. For example, the instructions can include the new name and location of the file, etc.

Figure 8:
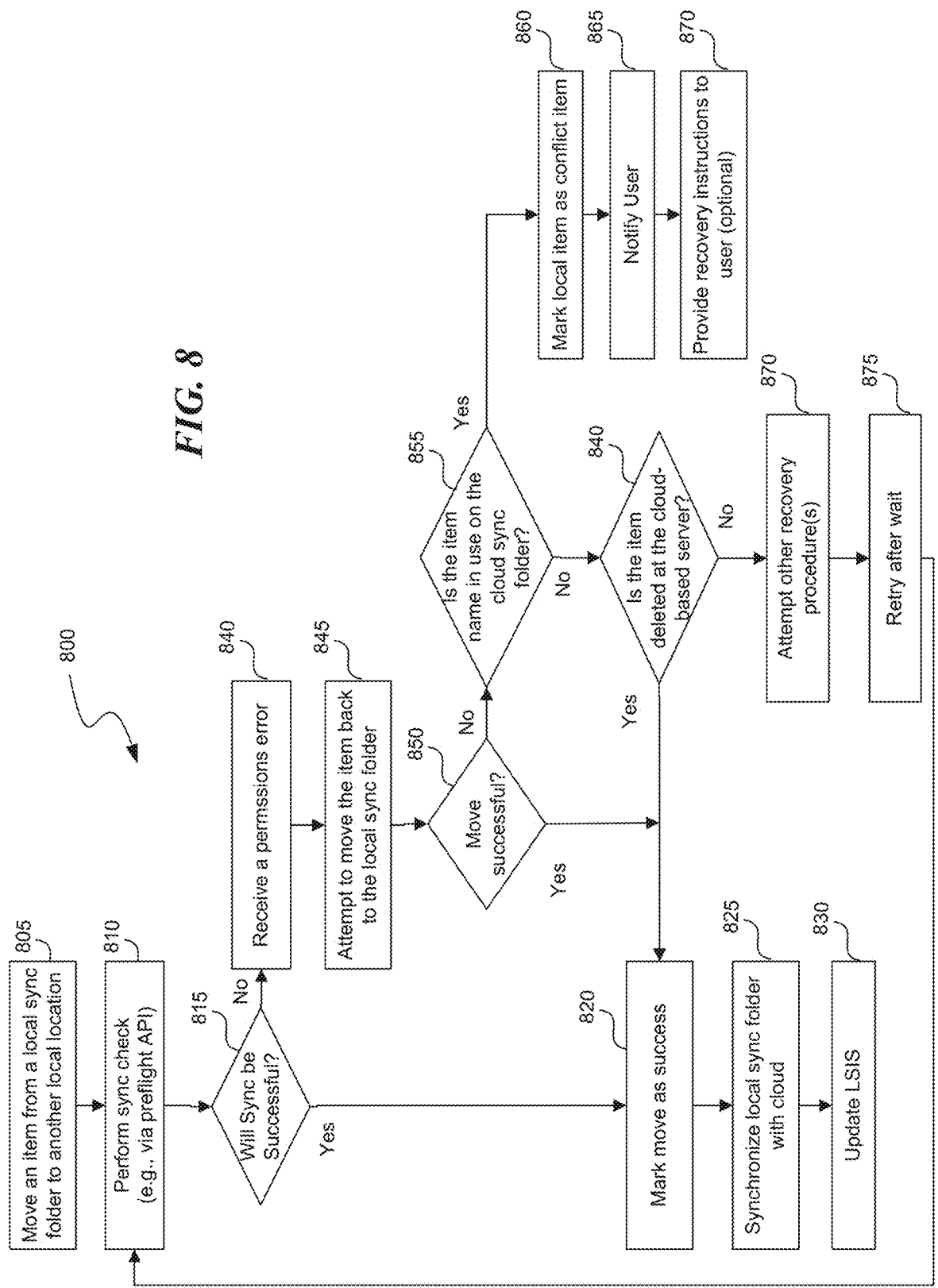
FIG. 8 depicts an example diagram illustrating a method of handling a "move" failure by a sync client on a client device.

FIG. 8 depicts an example diagram illustrating a method of handling a "move" failure by a sync client 110 on a client device. Similar method can be used to handle a "rename" failure in some embodiments. The sync client 110 can handle the move failure by reversing the move, i.e., moving the item back to where it was. However, this may fail when the original location is occupied or has no room. In that case, the sync client 110 can move the blocking item out of the way.

The example method 800 starts with a user deleting a local item in a sync folder at a client device at block 805. The sync client 110 can then perform a sync check on the local item with a host server at block 810. In some embodiments, the sync check can be performed by the preflight API. At a decision block 815, the sync client 110 determines if the sync is going to be successful. If the sync is going to be successful, the sync client 110 can mark the move as a success at block 820 and synchronize the local sync folder with the cloud at block 825. The sync client 110 can also update the Last Sync Item Store (LSIS) at block 830. If the sync is not going to be successful, the sync client 110 can receive a permissions error at block 840 and, at block 845, attempt to move the item back to the local sync folder to recover from the error. At decision block 850, the sync client 110 determines if the move is successful. If the move is successful, the sync client 110 can mark the move as a success at block 820. However, if the move is unsuccessful at decision block 850, the sync client 110 can determine if the item name is in use in the sync folder at decision block 855. If so, another item with the same name has moved into the sync folder. The sync client 110 can optionally rename the blocking item to a conflict name and move it to another location at block 860. The sync client 110 can then notify the user (e.g., collaborator operating the client device on which the sync client 110 is running) via the client device (e.g., via a permission denied message) about the unsuccessful sync and the state and location of the locally moved item at block 865. Lastly, at block 870, the sync client 110 can optionally provide the user with additional recovery instructions. For example, the instructions can include the new name and location of the file, etc.

If the item name is in not in use in the sync folder at decision block 855, the sync client 110 can attempt other recovery procedures as described herein at block 870. Lastly, at block 875, the sync client can retry the attempted sync (e.g., via preflight API) after a time interval or wait period.

Figure 9:
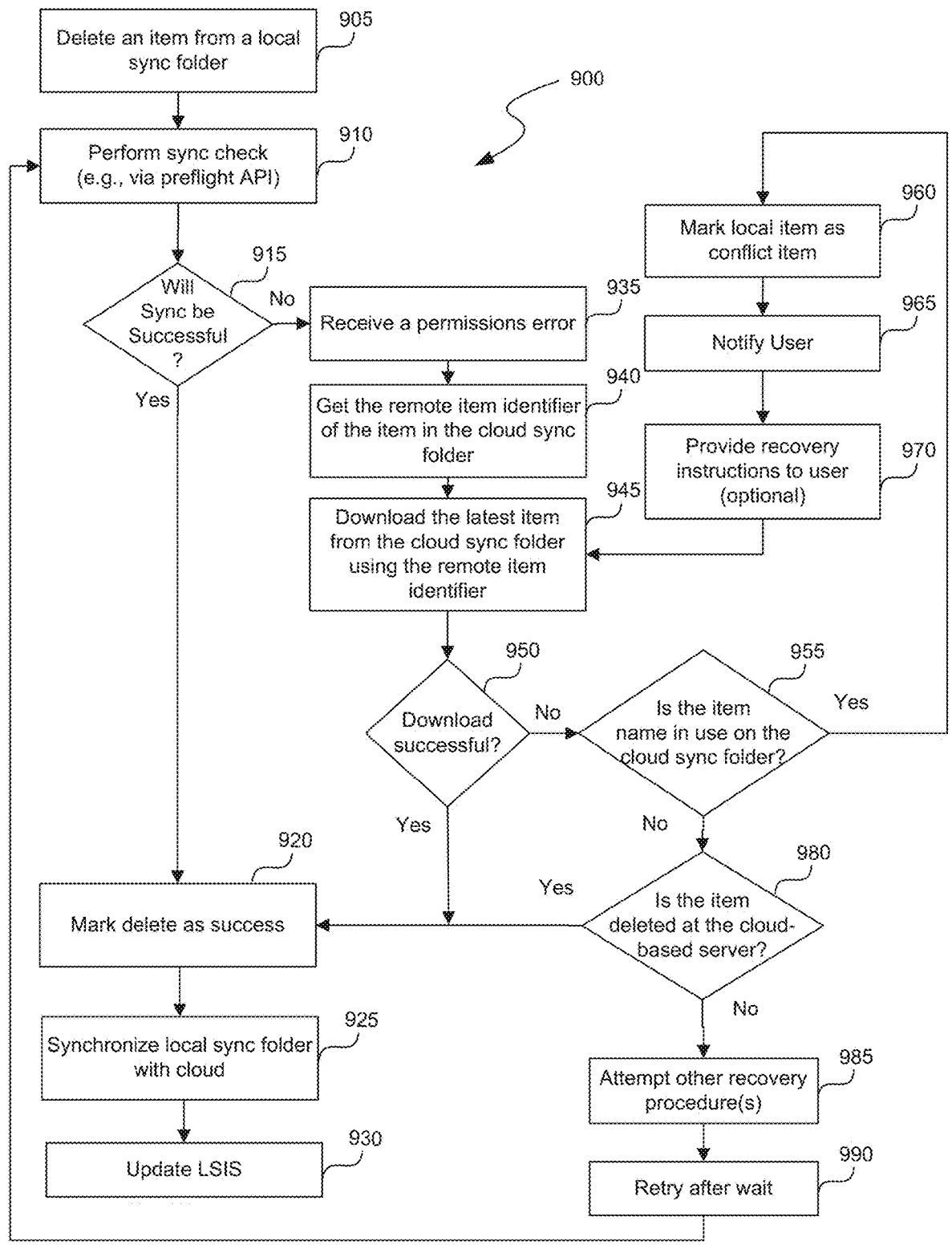
FIG. 9 depicts an example diagram illustrating a method of handling a "delete" failure by a sync client on a client device.

In some embodiments, when a delete of an item in a sync folder fails due to permissions, the sync client 110 can recover from the error by re-downloading the item to the sync folder from the host server 100. However, this recovery can fail if the original location is in use. FIG. 9 depicts an example diagram illustrating a method of handling a "delete" failure by a sync client 110 on a client device.

The example method 900 starts with a user deleting a local item in a sync folder at a client device at block 905. The sync client 110 can then perform a sync check on the local item with a host server at block 910. In some embodiments, the sync check can be performed by the preflight API. At a decision block 915, the sync client 110 determines if the sync is going to be successful. If the sync is going to be successful, the sync client 110 can mark the delete as a success at block 920 and synchronize the local sync folder with the cloud at block 925. The sync client 110 can also update the LSIS at block 930. If the sync is not going to be successful, the sync client 110 can receive a permissions error at block 935. At block 940, the sync client 110 can get the remote item identifier associated with the same item in the cloud sync folder and, at block 945, can download the item from the host server using the remote item identifier.

At decision block 950, the sync client 110 can determine if the download was successful. If the download result is a success, the sync client 110 can mark the delete (recovery) as a success. However, if the download result is not a success, the sync client 110 can, at decision block 955, determine if the item is in already use on the cloud (host) sync folder (e.g., name-in-use error). If so, the sync client 110 can optionally rename the blocking item to a conflict name and move it to another location at block 960. The sync client 110 can then notify the user (e.g., collaborator operating the client device on which the sync client 110 is running) via the client device (e.g., via a permission denied message) about the unsuccessful sync and the state and location of the locally moved item at block 965. At block 970, the sync client 110 can optionally provide the user with additional recovery instructions. For example, the instructions can include the new name and location of the file, etc. The sync client 110 can then attempt to download the latest item again at block 945.

If the item name is in not in use in the sync folder at decision block 855, the sync client 110 can determine if the item is deleted at the cloud-based (host) server at block 980. If the item is deleted, the sync client 110 can mark the delete as a success at block 920. If the item is not deleted, the sync client 110 can attempt other recovery procedures as described herein at block 985. Lastly, at block 990, the sync client can retry the attempted sync (e.g., via preflight API) after a time interval or wait period.

Figure 10:
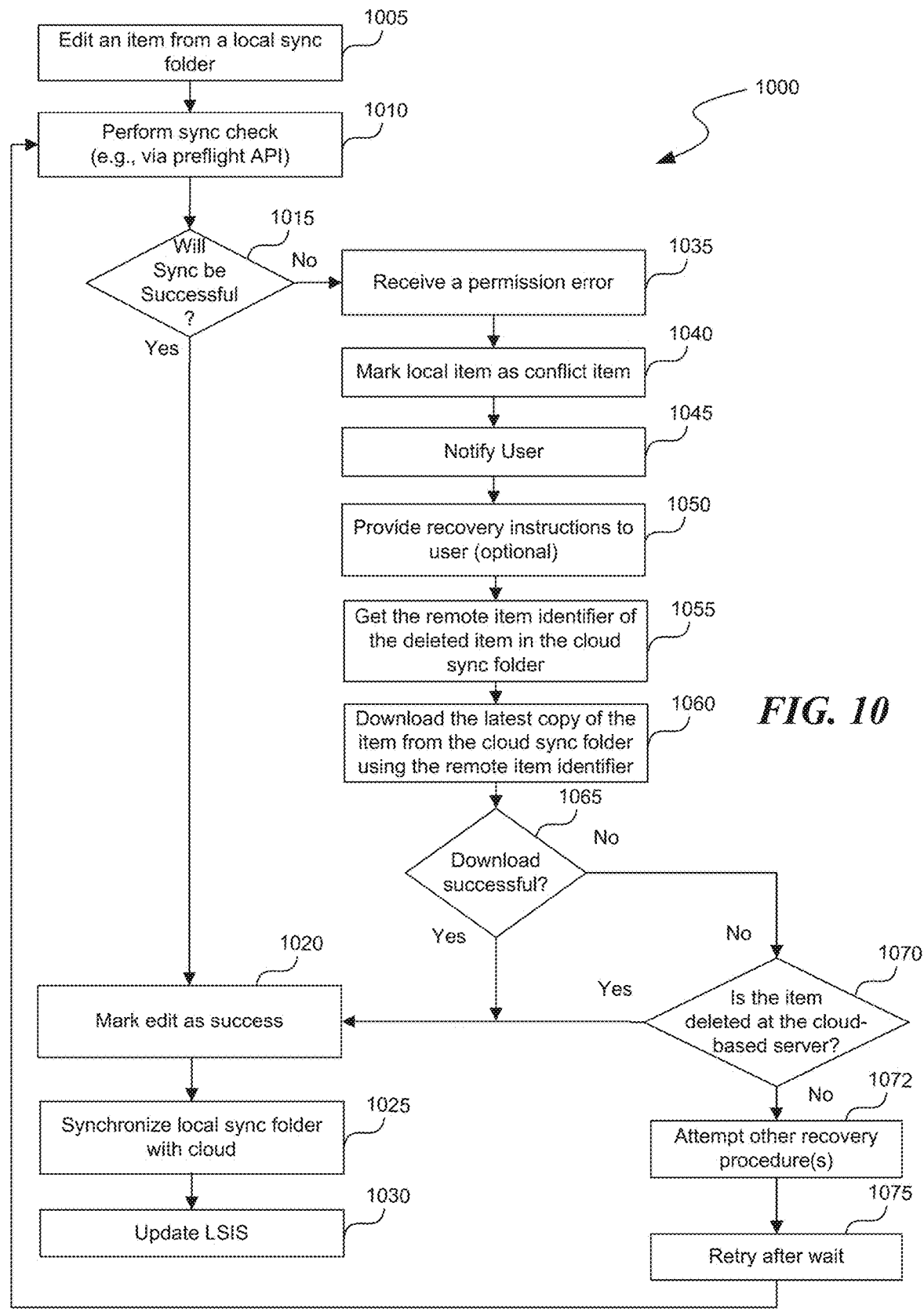
FIG. 10 depicts an example diagram illustrating a method of handling an "edit" failure by a sync client on a client device.

In some embodiments, an edit of a local item in a sync folder can fail due to permissions. To recover from this error, the sync client 110 can save the edits to the local item in a conflict copy and re-download the item from its original location. However, the re-download can fail under certain circumstances. FIG. 10 depicts an example diagram illustrating a method of handling an "edit" failure by a sync client 110 on a client device.

The example method 1000 starts with a user editing a local item in a sync folder at a client device at block 1005. The sync client 110 can then perform a sync check on the local item with a host server at block 1010. In some embodiments, the sync check can be performed by the preflight API. At a decision block 1015, the sync client 110 determines if the sync is going to be successful. If the sync is going to be successful, the sync client 110 can mark the edit as a success at block 1020 and synchronize the local sync folder with the cloud at block 1025. The sync client 110 can also update the LSIS at block 1030. If the sync is not going to be successful, the sync client 110 can receive a permissions error at block 1035. The sync client 110 can mark the item to as a conflict item and optionally the item move to another location at block 1040. The sync client 110 can then notify the user (e.g., collaborator operating the client device on which the sync client 110 is running) via the client device (e.g., via a permission denied message) about the unsuccessful sync and the state and location of the locally moved item at block 1045. At block 1050, the sync client 110 can optionally provide the user with additional recovery instructions. For example, the instructions can include the new name and location of the file, etc. At block 1055, the sync client 110 can get the remote item identifier associated with the same item in the cloud sync folder and, at block 1060, can download the item from the host server using the remote item identifier.

At decision block 1065, the sync client 110 can determine if the download was successful. If the download result is a success, the sync client 110 can mark the edit (recovery) as a success. However, if the download result is not a success, the sync client 110 can, at decision block 1070, determine if the item is deleted at the cloud-based (host) server. If the item is deleted, the sync client 110 can mark the delete as a success at block 1020. If the item is not deleted, the sync client 110 can attempt other recovery procedures as described herein at block 1072. Lastly, at block 1075, the sync client can retry the attempted sync (e.g., via preflight API) after a time interval or wait period.

Figure 11:
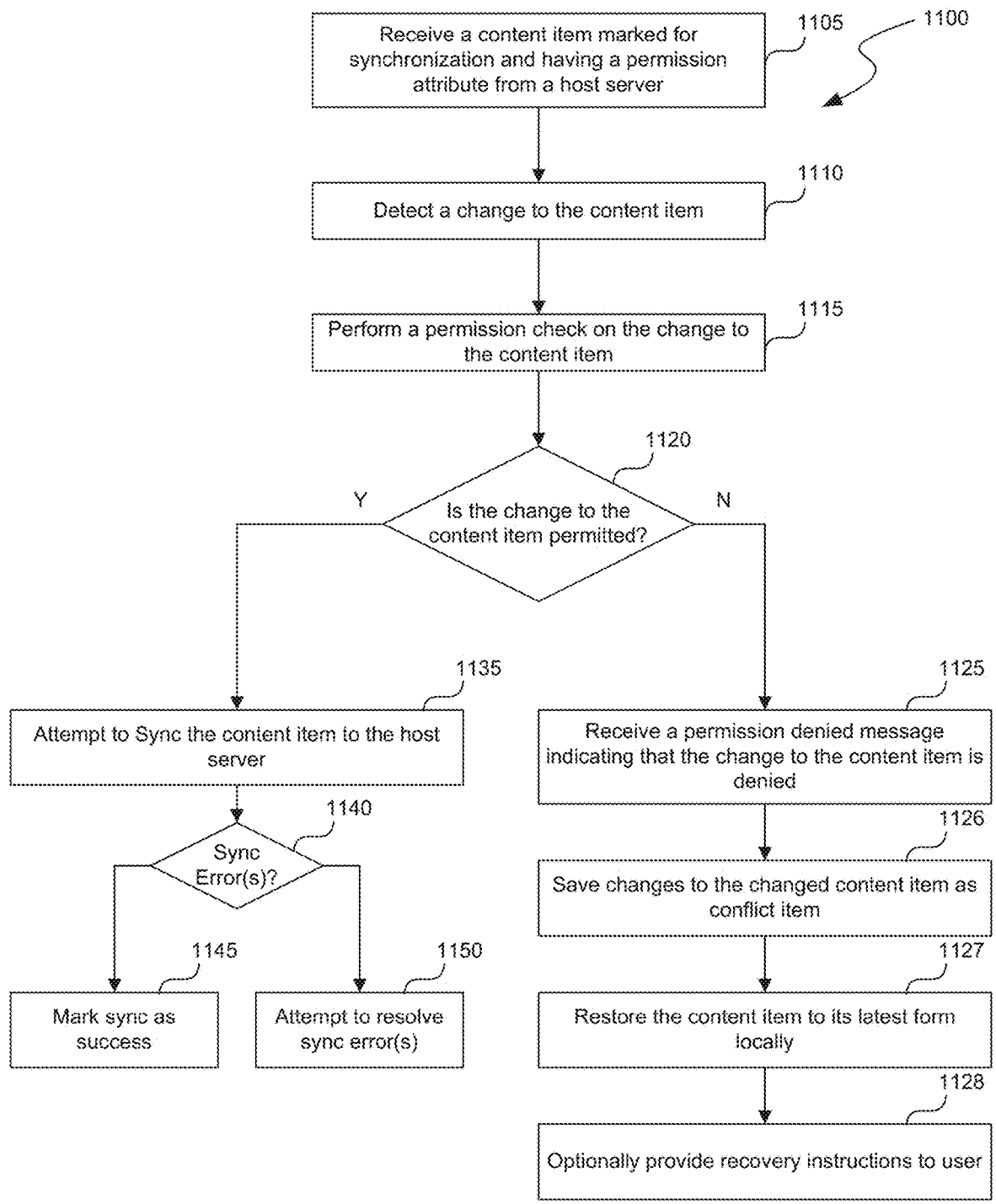
FIG. 11 depicts an example diagram illustrating a method of handling a change to a sync item having a permission attribute.

FIG. 11 depicts an example diagram illustrating a method of handling a change to a sync item having a permission attribute. In some embodiments, the method 1100 can be performed by the sync client 110 to handle local changes to the sync item (i.e., changes made to the sync item client side). The method 1100 starts at block 1105, with the sync client 110 receiving a content item marked for synchronization and having a permission attribute associated with it from the host server 100. The sync client 110 can detect a change to the content item at block 1110. The change is a local change (i.e., change to the sync item on the local file system). At block 1115, the sync client 110 can perform a permission check on the change to the content item. In some the permission check can be performed using an API (e.g., preflight API). The cloud-based server 100 can receive a notification of a change to the local copy of the content item from the client device and determine whether the change is permitted based on the permission attributes associated with the content item.

In some embodiments, the sync client 110 sets permissions on local file system and/or operating system. In such cases the local file system and/or operating system can manage some or all aspects of local permission verifications as described herein.

The sync client 110 can then receive a response to the permission check. If the change to the content item is permitted as indicated by the response to the permission check at decision block 1120, the sync client 110 can attempt to sync the content item to the host server 100 at block 1135 so that the host server 100 has the most up to date copy of the content item. At decision block 1140, the sync client 110 can determine if the sync was successful or if there were one or more sync errors. Sync errors can occur if, for example, permissions, sync items, etc., are modified by other collaborators or administrators on the cloud between the time the permission check is performed and the actual sync by the sync client 110. If no sync errors occur, the sync is marked as a success at block 1145. If a sync error does occur, then the sync client 110 can attempt to resolve those issues/errors at block 1150.

Alternatively, if the change to the content item is denied at decision block 1120, the sync client 110 can receive a permission denied message at block 1125. The sync client 110 can then initiate a recovery process to restore the content item to its original form. The recovery process can depend on the type of change to the content item. In some embodiments, the recovery process may itself fail, and those failures can be handled by the sync client. As illustrated in the example of FIG. 11, the recovery process includes blocks 1126-1128. Other recovery processes are also possible. In this example, at block 1126, the sync client 110 can save and/or mark the changed or new content item as a conflict item. At block 1127, the sync client 110 can restore the content item to a latest or most recent form locally. For example, this block can be achieved by downloading a copy of the latest item from the cloud. Lastly, at block 1128, recovery instructions can optionally be provided to the user as described herein.

Figure 12:
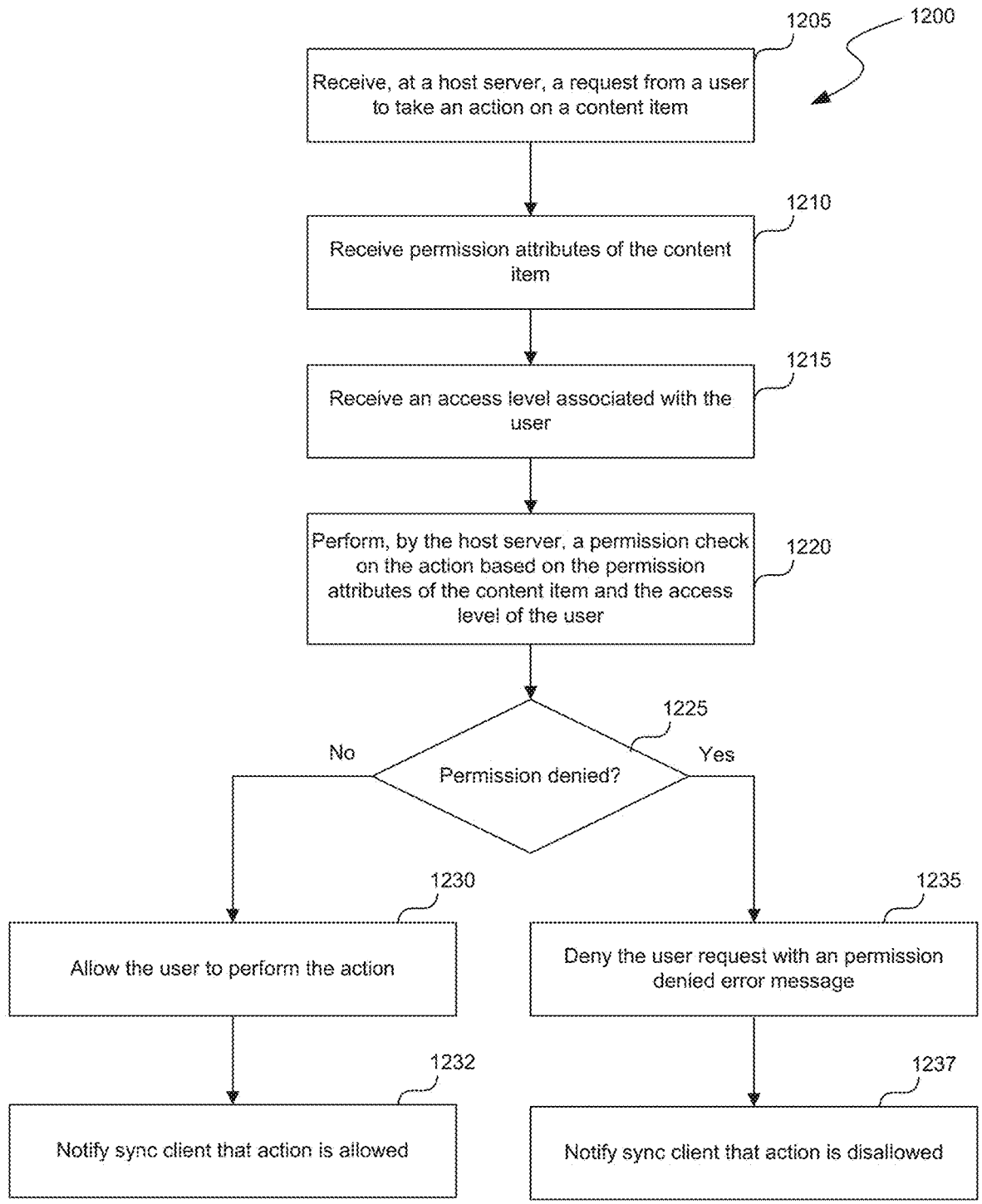
FIG. 12 depicts an example diagram illustrating a method of allowing or denying an action on a sync item based on one or more permission attributes of the item.

FIG. 12 depicts an example diagram illustrating a method of allowing or denying an action on a sync item based on one or more permission attributes of the item.

The example method 1200 starts at block 1205 with a host server receiving or detecting a request from a user to take an action on a sync item. At block 1210, the host server receives or retrieves one or more permission attributes of the sync item. At block 1215, the host server receives or retrieves an access level of the user. At block 1220, the host server can perform a permission check or verification on the action based on the one or more permission attributes and in some embodiments, the access level of the user. At decision block 1225, if the permission check results in permission denied, then the host server denies the user request with a permission denied error message at block 1235. Otherwise, the host server allows the user to perform the action at block 1230. At blocks 1232 and 1237, the host server notifies the sync client (e.g., sync client 110) whether or not the action is allowed.

Figure 13:
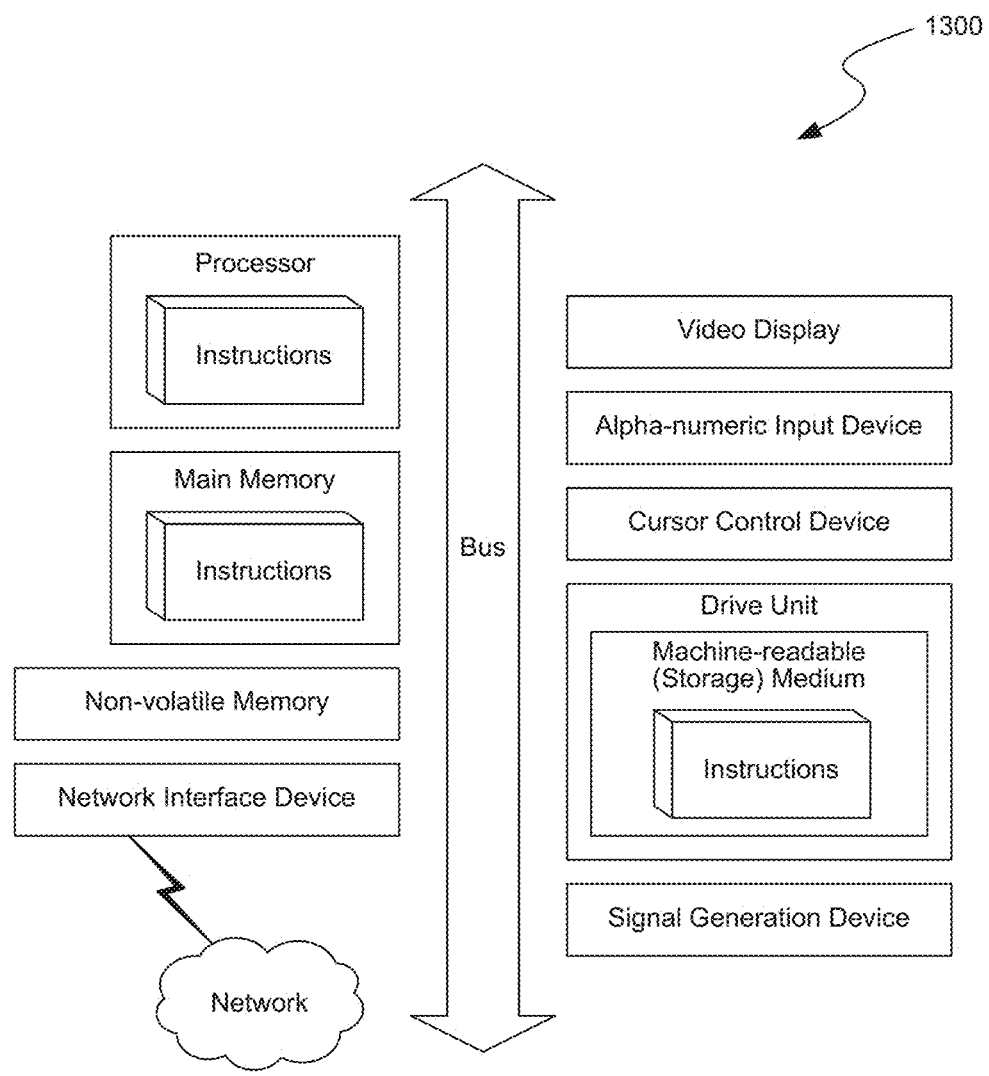
FIG. 13 depicts a diagrammatic representation of a machine in the example form of a computer system within which a set of instructions, for causing the machine to perform any one or more of the methodologies discussed herein, can be executed.

FIG. 13 shows a diagrammatic representation 1300 of a machine in the example form of a computer system within which a set of instructions, for causing the machine to perform any one or more of the methodologies discussed herein, can be executed.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a user device, a tablet, a phablet, a laptop computer, a set-top box (STB), a personal digital assistant (PDA), a thin-client device, a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 1300 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall can additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments can perform routines having steps, or employ systems having in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that can be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system can vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112(f), other aspects can likewise be embodied as a means-plus-function claim, or in other forms, such as being embodied in a computer-readable medium. (Any claim intended to be treated under 35 U.S.C. § 112(f) begins with the words "means for"). Accordingly, the applicant reserves the right to add additional claims after filing the application to pursue such additional claim forms for other aspects of the disclosure.

What is claimed is:

1. A method of restoring a content item marked for synchronization between a cloud-based server and at least one computer system, the method comprising:
    receiving, at the at least one computer system, a content item transmitted by a cloud-based server, wherein the content item is marked for synchronization between the cloud-based server and at the at least one computer system, and wherein the content item is associated with at least one permission attribute;
    caching the at least one permission attribute of the content item in a cache memory on the computer system;
    detecting, by the at least one computer system, a change to the content item on the computer system;
    responsive to detecting the change and prior to an attempt to upload the change to the content item to the cloud-based server, requesting, by the at least one computer system, a permission check from the cloud-based server to determine whether the change to the content item is permitted based, at least in part, on the at least one permission attribute associated with the content item;
    receiving, by the at least one computer system, a result of the permission check from the cloud-based server, the result indicating that the change to the content item will be rejected by the cloud-based server during a synchronization procedure; and
    restoring the content item based on the result indicating that the change to the content item will be rejected by the cloud-based server.

2. The method of claim 1, further comprising:
    rejecting an upload of the content item when the result of the permission check indicates that the change to the content item will be rejected.

3. The method of claim 1, wherein the cloud-based server is associated with a cloud-based storage and collaboration platform, and wherein the permission check with the cloud-based server is requested by the at least one computer system using a pre-flight application program interface (API) of the cloud-based server and without sending the content item to the cloud-based server.

4. The method of claim 3, wherein the content item is a folder, a sub-folder, or a file, the folder including a sub-folder or a file, and the sub-folder including a file, wherein the content item is stored in a workspace hosted at cloud-based storage, the workspace being associated with an enterprise and managed by an enterprise administrator.

5. The method of claim 4, wherein the enterprise administrator associates the at least one permission attribute with the content item that is marked for synchronization between the cloud-based server and the at least the computer system.

6. The method of claim 3, wherein the at least one permission attribute permits or restricts a user action that changes the content item, the user action including one or more of: creating a new content item inside the content item, moving the content item to another location, deleting the content item, editing the content item, or renaming the content item.

7. The method of claim 6, wherein when the at least one permission attribute restricts creating the new content item inside the content item, the result of the permission check indicates that the creation of the new content item will be rejected, and restoring the content item to its most recent form when the change to the content item will be rejected further comprises:
    moving the new content item to another location; and
    generating a notification message indicating that the creation of the new content item was rejected and that the new content item that was created was moved to another location.

8. The method of claim 6, wherein when the at least one permission attribute restricts editing of the content item, the result of the permission check indicates that the edit to the content item will be rejected, and restoring the content item to its most recent form when the change to the content item will be rejected comprises:
    creating a conflict copy that includes the edit to the content item;
    downloading a most recent copy of the content item from a repository of the cloud-based server; and
    generating a notification message indicating that the edit to the content item was rejected and that the edit to the content item was saved in the conflict copy.

9. The method of claim 6, wherein when the at least one permission attribute restricts deleting the content item and when the change to the content item includes a deletion of the content item, the result of the permission check indicates that the deletion of the content item will be rejected, and restoring the content item to its most recent form when the change to the content item will be rejected comprises:
    downloading the deleted folder or file from a repository of the cloud-based server; and
    generating a notification message indicating that the deletion of the content item was rejected and that the content item that was deleted was restored.

10. The method of claim 6, wherein when the permission attribute restricts renaming of the content item and when the change to the content item includes a renaming of the content item, the result of the permission check indicates that the renaming of the content item will be rejected, and restoring the content item to its most recent form when the change to the content item will be rejected further comprises:
    changing a new name of the content item from the renaming of the content item on the computer system to a name of the content item on the cloud-based server; and
    generating a notification message indicating that the renaming of the content item to the new name was rejected and that the new name of the content item stored locally on the computer system was restored to match the name of the content item on the cloud-based server.

11. The method of claim 6, wherein when the permission attribute restricts moving of the content item and when the change to the content item includes a moving of the content item, the result of the permission check indicates that the moving of the content item will be rejected, and restoring the content item to its most recent form when the change to the content item will be rejected further comprises:
   moving the content item into a same hierarchical location on the computer system as its counterpart on the cloud-based server; and
   generating a notification message indicating that the moving of the content item was rejected and that the content item was moved back to its original location.

12. The method of claim 3, wherein the at least one permission attribute permits or restricts a user action to add or create a tag for the content item, assign a task for the content item, access the content item from multiple computer systems, access the content item from a mobile device or invite external users to collaborate on the content item.

13. The method of claim 1, further comprising:
   visibly marking the content item on the computer system based on the at least one permission attribute to provide a visible indication of a type of permission attribute that the content item has.

14. The method of claim 13, further comprising instructions for receiving a change to the at least one permission attribute associated with the content item from the cloud-based server and in response, dynamically updating the visible marking on the content item on the client device based on the change to the permission attribute.

15. A non-transitory machine-readable storage medium having instructions stored thereon, which when executed by one or more processors of a computer system, cause the computer system to:
   process a content item transmitted by a cloud-based server, wherein the content item is marked for synchronization between the cloud-based server and at the at least one computer system, and wherein the content item is associated with at least one permission attribute;
   caching the at least one permission attribute of the content item in a cache memory on the computer system;
   detect a change to the content item on the computer system;
   responsive to detecting the change and prior to uploading the change to the content item to the cloud-based server, requesting a permission check from the cloud-based server to determine whether the change to the content item will be permitted based, at least in part, on the at least one permission attribute associated with the content item;
   process a result of the permission check transmitted by the cloud-based server, the result indicating that the change to the content item will be rejected by the cloud-based server during a synchronization procedure; and
   restore the content item based on the result indicating that the change to the content item will be rejected by the cloud-based server.

16. A system comprising:
   a processor; and
   a memory coupled with and readable by the processor and storing therein a set of instructions which, when executed by the processor, causes the processor to:
   process a content item transmitted by a cloud-based server, wherein the content item is marked for synchronization between the cloud-based server and at the at least one computer system, and wherein the content item is associated with at least one permission attribute;
   visibly mark the content item on the computer system based on the at least one permission attribute to provide a visible indication of a type of permission attribute that the content item has;
   detect a change to the content item on the computer system;
   responsive to detecting the change and prior to uploading the change to the content item to the cloud-based server, requesting a permission check from the cloud-based server to determine whether the change to the content item will be permitted based, at least in part, on the at least one permission attribute associated with the content item;
   process a result of the permission check transmitted by the cloud-based server, the result indicating that the change to the content item will be rejected by the cloud-based server during a synchronization procedure; and
   restore the content item based on the result indicating that the change to the content item will be rejected by the cloud-based server.

17. The system of claim 16, wherein the cloud-based server is associated with a cloud-based storage and collaboration platform, and wherein the permission check with the cloud-based server is requested by the at least one computer system using a pre-flight application program interface (API) of the cloud-based server and without sending the content item to the cloud-based server.

18. The system of claim 16, wherein the instructions further cause the processor to cache the at least one permission attribute of the content item in a cache memory on the computer system.

19. The system of claim 18, wherein the instructions further cause the processor to receive a change to the at least one permission attribute associated with the content item from the cloud-based server and in response, dynamically update the visible marking on the content item on the client device based on the change to the permission attribute.

20. The system of claim 16, wherein the at least one permission attribute permits or restricts a user action that changes the content item, the user action including one or more of: creating a new content item inside the content item, moving the content item to another location, deleting the content item, editing the content item, or renaming the content item, wherein when the at least one permission attribute restricts deleting the content item and when the change to the content item includes a deletion of the content item, the result of the permission check indicates that the deletion of the content item will be rejected, and restoring the content item to its most recent form when the change to the content item will be rejected comprises:
   downloading the deleted folder or file from a repository of the cloud-based server; and
   generating a notification message indicating that the deletion of the content item was rejected and that the content item that was deleted was restored.

* * * * *